(12) United States Patent
Meylan et al.

(10) Patent No.: US 10,716,047 B2
(45) Date of Patent: Jul. 14, 2020

(54) TECHNIQUES FOR SELECTING A RADIO ACCESS TECHNOLOGY OVER AN UNLICENSED RADIO FREQUENCY SPECTRUM BAND FOR SERVING A CLASS OF TRAFFIC

(71) Applicant: QUALCOMM Incorporated, San Diego, CA (US)

(72) Inventors: Arnaud Meylan, San Diego, CA (US); Suli Zhao, San Diego, CA (US); Ozcan Ozturk, San Diego, CA (US)

(73) Assignee: QUALCOMM Incorporated, San Diego, CA (US)

( * ) Notice: Subject to any disclaimer, the term of this patent is extended or adjusted under 35 U.S.C. 154(b) by 0 days.

(21) Appl. No.: 15/815,514

(22) Filed: Nov. 16, 2017

(65) Prior Publication Data
US 2018/0146408 A1  May 24, 2018

Related U.S. Application Data

(60) Provisional application No. 62/424,272, filed on Nov. 18, 2016.

(51) Int. Cl.
*H04W 36/00* (2009.01)
*H04W 36/26* (2009.01)
(Continued)

(52) U.S. Cl.
CPC ....... *H04W 36/26* (2013.01); *H04W 36/0085* (2018.08); *H04W 36/0088* (2013.01);
(Continued)

(58) Field of Classification Search
CPC .......... H04W 28/021; H04W 28/0205; H04W 36/26; H04W 40/04; H04W 48/20; H04W 4/14; H04W 52/42
(Continued)

(56) References Cited

U.S. PATENT DOCUMENTS 6,728,522 B1   4/2004  Marrah et al.
7,515,575 B1   4/2009  Shi et al.
(Continued)

FOREIGN PATENT DOCUMENTS

EP          3091778 A1     11/2016
WO    WO-2014089051 A1     6/2014
(Continued)

OTHER PUBLICATIONS

International Search Report and Written Opinion—PCT/US2017/062377—ISA/EPO—dated Mar. 19, 2018.

*Primary Examiner* — Joseph Arevalo
(74) *Attorney, Agent, or Firm* — Holland & Hart LLP/Qualcomm

(57) ABSTRACT

A method for wireless communication at a user equipment (UE) includes determining that both a cellular radio access technology (RAT) and a wireless local area network (WLAN) RAT are available over an unlicensed radio frequency spectrum band; obtaining measurements for at least the cellular RAT or the WLAN RAT; selecting, by the UE, one of the cellular RAT or the WLAN RAT for a class of traffic, where the selected RAT is selected based at least in part on the measurements; and serving the class of traffic based at least in part on the selected RAT.

18 Claims, 21 Drawing Sheets

(51) Int. Cl.
*H04W 48/12* (2009.01)
*H04W 48/16* (2009.01)
*H04W 72/10* (2009.01)
*H04W 84/12* (2009.01)
*H04W 16/14* (2009.01)
*H04W 36/14* (2009.01)

(52) U.S. Cl.
CPC ........... *H04W 48/12* (2013.01); *H04W 48/16* (2013.01); *H04W 72/10* (2013.01); *H04W 16/14* (2013.01); *H04W 36/14* (2013.01); *H04W 84/12* (2013.01)

(58) Field of Classification Search
USPC .... 455/434, 435.2, 450, 436, 418, 439, 437, 455/552.1, 456.5, 423, 452.1; 370/331
See application file for complete search history.

(56) References Cited

U.S. PATENT DOCUMENTS

| | | | |
|---|---|---|---|
| 2012/0094663 | A1 | 4/2012 | Awoniyi et al. |
| 2014/0161103 | A1* | 6/2014 | Sirotkin ................ H04W 24/10 370/332 |
| 2015/0195759 | A1* | 7/2015 | Sirotkin ................ H04W 8/005 370/331 |
| 2015/0327129 | A1* | 11/2015 | Faccin ............. H04W 36/0083 370/331 |
| 2016/0119072 | A1* | 4/2016 | Wang .................. H04L 27/0012 370/338 |
| 2016/0192286 | A1* | 6/2016 | Bergstrom ............ H04W 48/18 370/312 |
| 2016/0212629 | A1 | 7/2016 | Wei et al. |
| 2016/0219460 | A1* | 7/2016 | Huang-Fu ......... H04W 36/0083 |
| 2016/0219477 | A1* | 7/2016 | Bergstrom ............ H04W 36/14 |
| 2016/0249224 | A1 | 8/2016 | Prasad et al. |
| 2016/0338133 | A1* | 11/2016 | Lee ........................ H04W 72/12 |
| 2016/0373935 | A1* | 12/2016 | Smith .................... H04W 16/14 |
| 2017/0127325 | A1* | 5/2017 | Vikberg .............. H04L 5/0035 |
| 2017/0332359 | A1* | 11/2017 | Tsai ..................... H04B 7/0617 |
| 2018/0049208 | A1* | 2/2018 | Ozturk ............... H04W 28/085 |
| 2018/0227902 | A1* | 8/2018 | Gholmieh ........... H04W 72/048 |
| 2018/0270742 | A1* | 9/2018 | Bergstrom ........... H04W 40/244 |
| 2018/0288637 | A1* | 10/2018 | Laselva ................. H04W 76/28 |

FOREIGN PATENT DOCUMENTS

| | | |
|---|---|---|
| WO | WO-2015115759 A1 | 8/2015 |
| WO | WO-2015117673 A1 | 8/2015 |

\* cited by examiner

```
In the E-UTRAN serving cell {
    RSRPmeas < Thresh_{servingOffloadWLAN, LowP}; or
    RSRQmeas < Thresh_{servingOffloadWLAN, LowQ};
}
In the target WLAN {
    ChannelUtilizationWLAN < Thresh_{ChUtilWLAN, Low}; and
    BackhaulRateDlWLAN > Thresh_{BackhRateDLWLAN, High}; and
    BackhaulRateUlWLAN > Thresh_{BackhRateULWLAN, High}; and
    WLANRSSI > Thresh_{WLANRSSI, High};
}
```

FIG. 4

```
WLAN-OffloadConfig-r12 ::=                    SEQUENCE {
    thresholdRSRP-r12                             SEQUENCE {
        thresholdRSRP-Low-r12                         RSRP-Range,
        thresholdRSRP-High-r12                        RSRP-Range
    }                                                                   OPTIONAL, -- Need OR
    thresholdRSRQ-r12                             SEQUENCE {
        thresholdRSRQ-Low-r12                         RSRQ-Range,
        thresholdRSRQ-High-r12                        RSRQ-Range
    }                                                                   OPTIONAL, -- Need OR
    thresholdRSRQ-OnAllSymbolsWithWB-r12  SEQUENCE {
        thresholdRSRQ-OnAllSymbolsWithWB-Low-r12      RSRQ-Range,
        thresholdRSRQ-OnAllSymbolsWithWB-High-r12     RSRQ-Range
    }                                                                   OPTIONAL, -- Need OP
    thresholdRSRQ-OnAllSymbols-r12                SEQUENCE {
            thresholdRSRQ-OnAllSymbolsLow-r12         RSRQ-Range,
            thresholdRSRQ-OnAllSymbolsHigh-r12        RSRQ-Range
    }                                                                   OPTIONAL, -- Need OP
    thresholdRSRQ-WB-r12                          SEQUENCE {
        thresholdRSRQ-WB-Low-r12                      RSRQ-Range,
        thresholdRSRQ-WB-High-r12                     RSRQ-Range
    }                                                                   OPTIONAL, -- Need OP
    thresholdRSRPeLAA-r1x                         SEQUENCE {
        thresholdRSRP-Low-r12                         RSRP-Range,
        thresholdRSRP-High-r12                        RSRP-Range
    }                                                                   OPTIONAL, -- Need OR
    thresholdRSRQeLAA-r1x                         SEQUENCE {
        thresholdRSRQ-Low-r12                         RSRQ-Range,
        thresholdRSRQ-High-r12                        RSRQ-Range
    }                                                                   OPTIONAL, -- Need OR
    thresholdChannelUtilization-r12               SEQUENCE {
        thresholdChannelUtilizationLow-r12            INTEGER (0..255),
        thresholdChannelUtilizationHigh-r12           INTEGER (0..255)
    }                                                                   OPTIONAL, -- Need OR
    thresholdBackhaul-Bandwidth-r12               SEQUENCE {
        thresholdBackhaulDL-BandwidthLow-r12  WLAN-backhaulRate-r12,
        thresholdBackhaulDL-BandwidthHigh-r12 WLAN-backhaulRate-r12,
        thresholdBackhaulUL-BandwidthLow-r12  WLAN-backhaulRate-r12,
        thresholdBackhaulUL-BandwidthHigh-r12 WLAN-backhaulRate-r12
    }                                                                   OPTIONAL, -- Need OR
    thresholdWLAN-RSSI-r12                        SEQUENCE {
        thresholdWLAN-RSSI-Low-r12                    INTEGER (0..255),
        thresholdWLAN-RSSI-High-r12                   INTEGER (0..255)
    }
    thresholdWLAN-RSSI-r1x                        SEQUENCE {
        thresholdWLAN-RSSI-Low-eLAA-r1x               INTEGER (0..255),
        thresholdWLAN-RSSI-High-eLAA-r1x              INTEGER (0..255)
    }                                                                   OPTIONAL, -- Need OR
    offloadPreferenceIndicator-r12   BIT STRING (SIZE (16))              OPTIONAL, -- Need OR
    t-SteeringWLAN-r12               T-Reselection                       OPTIONAL, -- Need OR
    ...
}
```

SystemInformationBlockType17 information element

```
-- ASN1START

SystemInformationBlockType17-r12 ::= SEQUENCE {
    wlan-OffloadInfoPerPLMN-List-r12    SEQUENCE (SIZE (1..maxPLMN-r11)) OF
                                            WLAN-OffloadInfoPerPLMN-r12
                                                                            OPTIONAL,   -- Need OR
    lateNonCriticalExtension            OCTET STRING                        OPTIONAL,
    ...
}
                                            605        610
WLAN-OffloadInfoPerPLMN-r12 ::=
    SEQUENCE {
        wlan-OffloadConfigCommon-r12    WLAN-OffloadConfig-r12      OPTIONAL,   -- Need OR
        wlan-OffCnfgCommon-eLAA-r1x     WLAN-OffloadConfig-r12      OPTIONAL,   -- Need OR
        wlan-Id-List-r12                WLAN-Id-List-r12            OPTIONAL,   -- Need OR
        ...
    }

WLAN-Id-List-r12 ::=                    SEQUENCE (SIZE (1..maxWLAN-Id-r12)) OF WLAN-Identifiers-r12

WLAN-Identifiers-r12 ::=
    SEQUENCE {
        ssid-r12            OCTET STRING (SIZE (1..32))             OPTIONAL,   -- Need OR
        bssid-r12           OCTET STRING (SIZE (6))                 OPTIONAL,   -- Need OR
        hessid-r12          OCTET STRING (SIZE (6))                 OPTIONAL,   -- Need OR
        ...
    }

-- ASN1STOP
```

FIG. 6

TECHNIQUES FOR SELECTING A RADIO ACCESS TECHNOLOGY OVER AN UNLICENSED RADIO FREQUENCY SPECTRUM BAND FOR SERVING A CLASS OF TRAFFIC

CROSS REFERENCES

The present Application for Patent claims priority to U.S. Provisional Patent Application No. 62/424,272 by Meylan, et al., entitled "Techniques For Selecting A Radio Access Technology Over An Unlicensed Radio Frequency Spectrum Band For Serving A Class of Traffic," filed Nov. 18, 2016, assigned to the assignee hereof.

BACKGROUND

Field of the Disclosure

The present disclosure, for example, relates to wireless communication systems, and more particularly techniques for selecting a radio access technology (RAT) over an unlicensed radio frequency spectrum band for serving a class of traffic.

Description of Related Art

Wireless communication systems are widely deployed to provide various types of communication content such as voice, video, packet data, messaging, broadcast, and so on. These systems may be multiple-access systems capable of supporting communication with multiple users by sharing the available system resources (e.g., time, frequency, and power). Examples of such multiple-access systems include code-division multiple access (CDMA) systems, time-division multiple access (TDMA) systems, frequency-division multiple access (FDMA) systems, and orthogonal frequency-division multiple access (OFDMA) systems.

A wireless multiple-access communication system may include a number of network access devices, each simultaneously supporting communication for multiple communication devices, otherwise known as user equipment (UEs). In a Long-Term Evolution (LTE) or LTE-Advanced (LTE-A) network, a network access device may take the form of a base station, with a set of one or more base stations defining an eNodeB (eNB). In a next generation, 5G, or new radio (NR) network, a network access device may take the form of a smart radio head (RH) or access node controller (ANC), with a set of smart radio heads in communication with an ANC defining a gNodeB (gNB). In a wireless local area network (WLAN), a network access device may take the form of a WLAN access point. A network access device may communicate with a UE on downlink channels (e.g., for transmissions from the network access device to the UE) and uplink channels (e.g., for transmissions from the UE to the network access device).

Some modes of communication may enable communication between a network access device and a UE over an unlicensed radio frequency spectrum band, or over different radio frequency spectrum bands (e.g., a licensed radio frequency spectrum band and an unlicensed radio frequency spectrum band). With increasing data traffic in cellular networks that use a licensed radio frequency spectrum band, offloading of at least some data traffic to an unlicensed radio frequency spectrum band may provide a mobile network operator (or cellular operator) with opportunities for enhanced data transmission capacity. Use of an unlicensed radio frequency spectrum band may also provide service in areas where access to a licensed radio frequency spectrum band is unavailable.

SUMMARY

A UE may sometimes be within the coverage area of multiple network access devices, and the multiple network access devices may support wireless communication using multiple RATs. A UE may also or alternatively be within the coverage area of a network access device that, itself, supports wireless communication using multiple RATs. In either of these scenarios, the UE may sometimes select one or more of the available RATs and/or network access devices for serving a class of traffic. In some examples, the class of traffic may include a gateway connection associated with an access point name (APN), and serving the class of traffic may include initiating the gateway connection, offloading the gateway connection (e.g., from a first RAT to a second RAT), or handing over the gateway connection (e.g., from a source network access device to a target network access device). In some examples, the gateway connection may include an Internet gateway connection, a voice over internet protocol (VoIP) gateway connection, or an evolved packet data gateway (ePDG) connection. In some examples, the available RATs may include a cellular RAT and a WLAN RAT over an unlicensed radio frequency spectrum band, and the UE may select one of the cellular RAT or the WLAN RAT for serving the class of traffic. Techniques described in the present disclosure describe, for example, how the UE may determine when both the cellular RAT and the WLAN RAT are available over the unlicensed radio frequency spectrum band, and how a network access device or other entity may influence (e.g., control) whether the UE selects the cellular RAT or the WLAN RAT over the unlicensed radio frequency spectrum band.

In some examples, a method for wireless communication at a UE is described. The method may include determining that both a cellular RAT and a WLAN RAT are available over an unlicensed radio frequency spectrum band; obtaining measurements for at least the cellular RAT or the WLAN RAT; selecting, by the UE, one of the cellular RAT or the WLAN RAT for a class of traffic; and serving the class of traffic based at least in part on the selected RAT. The selected RAT may be selected based at least in part on the measurements.

In some examples of the method, the selected RAT may include the cellular RAT. In some examples, the method may include saving at least one of identifiers of network access devices that configure the UE to communicate over the unlicensed radio frequency spectrum band based at least in part on the cellular RAT, or physical cell identities associated with the network access devices that configure the UE to communicate over the unlicensed radio frequency spectrum band based at least in part on the cellular RAT; and identifying a network access device within range of the UE. In these examples, determining that the cellular RAT is available over the unlicensed radio frequency spectrum band may include determining that an identifier of the network access device or a PCI associated with the network access device is saved.

In some examples, the method may include receiving, from a network access device, a measurement configuration for a predetermined radio frequency spectrum band. In these examples, the determination that the cellular RAT is available over the unlicensed radio frequency spectrum band may be based at least in part on receiving the measurement configuration for the predetermined radio frequency spectrum band from the network access device. In some examples, the predetermined radio frequency spectrum band may include a 5 GHz radio frequency spectrum band. In some examples, the predetermined radio frequency spectrum band may include the unlicensed radio frequency spectrum band.

In some examples of the method, determining that the cellular RAT is available over the unlicensed radio frequency spectrum band may include receiving, in a broadcast control channel (BCCH), an indication that a network access device supports a use of the cellular RAT over the unlicensed radio frequency spectrum band. In some examples, the method may include receiving, from a network access device, an indication of at least one carrier frequency of at least one usable carrier of the cellular RAT over the unlicensed radio frequency spectrum band. In these examples, the measurements on the cellular RAT may be obtained for the at least one usable carrier. In some examples, obtaining the measurements may include determining at least one of a reference signal received power (RSRP), a reference signal received quality (RSRQ), or a combination thereof. In some examples, the method may include selecting a WLAN channel in the unlicensed radio frequency spectrum band, the WLAN channel may be selected for operating a WLAN service, and the WLAN channel may be selected based at least in part on a bandwidth used for the cellular RAT over the unlicensed radio frequency spectrum band.

In some examples, the method may include receiving system information including radio access network (RAN) rules. The RAN rules may include at least one threshold for selecting the cellular RAT or the WLAN RAT based on the measurements. In these examples, the determination that the cellular RAT is available over the unlicensed radio frequency spectrum band may be based at least in part on receiving the at least one threshold, and the selection of the cellular RAT or the WLAN RAT may be based at least in part on a comparison of the measurements to the at least one threshold. In some examples, the at least one threshold may be included in a cellular RAT over a licensed radio frequency spectrum band to WLAN RAT offload configuration information element (IE) of the system information, or a cellular RAT over a licensed radio frequency spectrum band to cellular RAT over an unlicensed radio frequency spectrum band offload configuration IE of the system information. In some examples, the method may include receiving an access network discovery and selection function (ANDSF) management object including ANDSF rules. The ANDSF rules may include at least one threshold for selecting the cellular RAT or the WLAN RAT based on the measurements. In these examples, the selection of the cellular RAT or the WLAN RAT may be based at least in part on a comparison of the measurements to the at least one threshold.

In some examples, the class of traffic may include a gateway connection associated with an APN, and serving the class of traffic may include at least one of initiating the gateway connection, offloading the gateway connection, or performing a handover of the gateway connection. In some examples, the method may include determining that the WLAN RAT is associated with a WLAN having a lower priority than a cellular network associated with the cellular RAT, and selecting the cellular RAT over the WLAN RAT based at least in part on the determined availability of the cellular RAT and the determined lower priority of the WLAN. In some examples, the method may include receiving, from a network access device, an indication that the WLAN is associated with the lower priority than the cellular network. In some examples, the WLAN may have the lower priority than the cellular network for the class of traffic.

In one example, an apparatus for wireless communication at a UE is described. The apparatus may include means for determining that both a cellular RAT and a WLAN RAT are available over an unlicensed radio frequency spectrum band; means for obtaining measurements for at least the cellular RAT or the WLAN RAT; means for selecting, by the UE, one of the cellular RAT or the WLAN RAT for a class of traffic; and means for serving the class of traffic based at least in part on the selected RAT. The selected RAT may be selected based at least in part on the measurements.

In some examples of the apparatus, the selected RAT may include the cellular RAT. In some examples, the apparatus may include means for saving at least one of identifiers of network access devices that configure the UE to communicate over the unlicensed radio frequency spectrum band based at least in part on the cellular RAT, or physical cell identities associated with the network access devices that configure the UE to communicate over the unlicensed radio frequency spectrum band based at least in part on the cellular RAT; and means for identifying a network access device within range of the UE. In these examples, the means for determining that the cellular RAT is available over the unlicensed radio frequency spectrum band may include means for determining that an identifier of the network access device or a PCI associated with the network access device is saved.

In some examples, the apparatus may include means for receiving, from a network access device, a measurement configuration for a predetermined radio frequency spectrum band. In these examples, the determination that the cellular RAT is available over the unlicensed radio frequency spectrum band may be based at least in part on receiving the measurement configuration for the predetermined radio frequency spectrum band from the network access device. In some examples, the predetermined radio frequency spectrum band may include a 5 GHz radio frequency spectrum band. In some examples, the predetermined radio frequency spectrum band may include the unlicensed radio frequency spectrum band.

In some examples of the apparatus, the means for determining that the cellular RAT is available over the unlicensed radio frequency spectrum band may include means for receiving, in a BCCH, an indication that a network access device supports a use of the cellular RAT over the unlicensed radio frequency spectrum band. In some examples, the apparatus may include means for receiving, from a network access device, an indication of at least one carrier frequency of at least one usable carrier of the cellular RAT over the unlicensed radio frequency spectrum band. In these examples, the measurements on the cellular RAT may be obtained for the at least one usable carrier. In some examples, the means for obtaining the measurements may include means for determining at least one of a RSRP, a RSRQ, or a combination thereof. In some examples, the apparatus may include means for selecting a WLAN channel in the unlicensed radio frequency spectrum band. The WLAN channel may be selected for operating a WLAN service, and the WLAN channel may be selected based at least in part on a bandwidth used for the cellular RAT over the unlicensed radio frequency spectrum band.

In some examples, the apparatus may include means for receiving system information including RAN rules. The RAN rules may include at least one threshold for selecting the cellular RAT or the WLAN RAT based on the measurements. The determination that the cellular RAT is available over the unlicensed radio frequency spectrum band may be based at least in part on receiving the at least one threshold, and the selection of the cellular RAT or the WLAN RAT may be based at least in part on a comparison of the measurements to the at least one threshold. In some examples, the at least one threshold may be included in a cellular RAT over a licensed radio frequency spectrum band to WLAN RAT offload configuration IE of the system information, or a cellular RAT over a licensed radio frequency spectrum band to cellular RAT over an unlicensed radio frequency spectrum band offload configuration IE of the system information. In some examples, the apparatus may include means for receiving an ANDSF management object including ANDSF rules. The ANDSF rules may include at least one threshold for selecting the cellular RAT or the WLAN RAT based on the measurements. In these examples, the selection of the cellular RAT or the WLAN RAT may be based at least in part on a comparison of the measurements to the at least one threshold.

In some examples, the class of traffic may include a gateway connection associated with an APN, and the means for serving the class of traffic may include at least one of means for initiating the gateway connection, means for offloading the gateway connection, or means for performing a handover of the gateway connection. In some examples, the apparatus may include means for determining that the WLAN RAT is associated with a WLAN having a lower priority than a cellular network associated with the cellular RAT, and means for selecting the cellular RAT over the WLAN RAT based at least in part on the determined availability of the cellular RAT and the determined lower priority of the WLAN. In some examples, the apparatus may include means for receiving, from a network access device, an indication that the WLAN is associated with the lower priority than the cellular network. In some examples, the WLAN may have the lower priority than the cellular network for the class of traffic.

In one example, another apparatus for wireless communication at a UE is described. The apparatus may include a processor, memory in electronic communication with the processor, and instructions stored in the memory. The instructions may be executable by the processor to determine that both a cellular RAT and a WLAN RAT are available over an unlicensed radio frequency spectrum band; to obtain measurements for at least the cellular RAT or the WLAN RAT; to select, by the UE, one of the cellular RAT or the WLAN RAT for a class of traffic; and to serve the class of traffic based at least in part on the selected RAT. The selected RAT may be selected based at least in part on the measurements.

In some examples of the apparatus, the selected RAT may include the cellular RAT. In some examples, the instructions may be executable by the processor to save at least one of identifiers of network access devices that configure the UE to communicate over the unlicensed radio frequency spectrum band based at least in part on the cellular RAT, or physical cell identities associated with the network access devices that configure the UE to communicate over the unlicensed radio frequency spectrum band based at least in part on the cellular RAT; and to identify a network access device within range of the UE. In these examples, determining that the cellular RAT is available over the unlicensed radio frequency spectrum band may include determining that an identifier of the network access device or a PCI associated with the network access device is saved.

In some examples of the apparatus, the instructions may be executable by the processor to receive, from a network access device, a measurement configuration for a predetermined radio frequency spectrum band. In these examples, the determination that the cellular RAT is available over the unlicensed radio frequency spectrum band may be based at least in part on receiving the measurement configuration for the predetermined radio frequency spectrum band from the network access device. In some examples, the predetermined radio frequency spectrum band may include a 5 GHz radio frequency spectrum band. In some examples, the predetermined radio frequency spectrum band may include the unlicensed radio frequency spectrum band.

In some examples of the apparatus, determining that the cellular RAT is available over the unlicensed radio frequency spectrum band may include receiving, in a BCCH, an indication that a network access device supports a use of the cellular RAT over the unlicensed radio frequency spectrum band. In some examples, the instructions may be executable by the processor to receive, from a network access device, an indication of at least one carrier frequency of at least one usable carrier of the cellular RAT over the unlicensed radio frequency spectrum band. In these examples, the measurements on the cellular RAT may be obtained for the at least one usable carrier. In some examples, the instructions executable by the processor to obtain the measurements may include instructions executable by the processor to determine at least one of a RSRP, a RSRQ, or a combination thereof. In some examples, the instructions may be executable by the processor to select a WLAN channel in the unlicensed radio frequency spectrum band. The WLAN channel may be selected for operating a WLAN service, and the WLAN channel may be selected based at least in part on a bandwidth used for the cellular RAT over the unlicensed radio frequency spectrum band.

In some examples of the apparatus, the instructions may be executable by the processor to receive system information including RAN rules. The RAN rules may include at least one threshold for selecting the cellular RAT or the WLAN RAT based on the measurements. In these examples, the determination that the cellular RAT is available over the unlicensed radio frequency spectrum band may be based at least in part on receiving the at least one threshold, and the selection of the cellular RAT or the WLAN RAT may be based at least in part on a comparison of the measurements to the at least one threshold. In some examples, the at least one threshold may be included in a cellular RAT over a licensed radio frequency spectrum band to WLAN RAT offload configuration IE of the system information, or a cellular RAT over a licensed radio frequency spectrum band to cellular RAT over an unlicensed radio frequency spectrum band offload configuration IE of the system information. In some examples, the instructions may be executable by the processor to receive an ANDSF management object including ANDSF rules. In these examples, the ANDSF rules may include at least one threshold for selecting the cellular RAT or the WLAN RAT based on the measurements, and the selection of the cellular RAT or the WLAN RAT may be based at least in part on a comparison of the measurements to the at least one threshold.

In some examples, establishing the gateway connection may include at least one of initiating the gateway connection, offloading the gateway connection, or performing a handover of the gateway connection. In some examples, the instructions may be executable by the processor to determine that the WLAN RAT is associated with a WLAN having a lower priority than a cellular network associated with the cellular RAT, and to select the cellular RAT over the WLAN RAT based at least in part on the determined availability of the cellular RAT and the determined lower priority of the WLAN. In some examples, the the instructions may be executable by the processor to receive, from a network access device, an indication that the WLAN is associated with the lower priority than the cellular network. In some examples, the WLAN may have the lower priority than the cellular network for the class of traffic.

In one example, a computer program product is described. The computer program product may include a non-transitory computer-readable medium. The non-transitory computer-readable medium may include instructions to determine that both a cellular RAT and a WLAN RAT are available over an unlicensed radio frequency spectrum band; instructions to obtain measurements for at least the cellular RAT or the WLAN RAT; instructions to select, by the UE, one of the cellular RAT or the WLAN RAT for a class of traffic; and instructions to serve the class of traffic based at least in part on the selected RAT. The selected RAT may be selected based at least in part on the measurements.

In one example, a method for wireless communication at a network access device is described. The method may include indicating that the network access device supports a cellular RAT over an unlicensed radio frequency spectrum band, and communicating with at least one UE based at least in part on the cellular RAT over the unlicensed radio frequency spectrum band.

In some examples of the method, indicating that the network access device supports the cellular RAT over the unlicensed radio frequency spectrum band may include transmitting a measurement configuration for a predetermined radio frequency spectrum band. In some examples, the predetermined radio frequency spectrum band may include a 5 GHz radio frequency spectrum band. In some examples, the predetermined radio frequency spectrum band may include the unlicensed radio frequency spectrum band. In some examples, indicating that the network access device supports the cellular RAT over the unlicensed radio frequency spectrum band may include transmitting, in a BCCH, an indication that the network access device supports the cellular RAT over the unlicensed radio frequency spectrum band. In some examples, the method may include transmitting an indication of at least one carrier frequency of at least one usable carrier of the cellular RAT over the unlicensed radio frequency spectrum band. In some examples, the method may include indicating that a WLAN has a lower priority than a cellular network associated with the cellular RAT. In some examples, the indication that the WLAN has the lower priority than the cellular network may indicate that the WLAN has the lower priority than the cellular network for a class of traffic.

In one example, an apparatus for wireless communication at a network access device is described. The apparatus may include means for indicating that the network access device supports a cellular RAT over an unlicensed radio frequency spectrum band, and means for communicating with at least one UE based at least in part on the cellular RAT over the unlicensed radio frequency spectrum band.

In some examples of the apparatus, the means for indicating that the network access device supports the cellular RAT over the unlicensed radio frequency spectrum band may include means for transmitting a measurement configuration for a predetermined radio frequency spectrum band. In some examples, the predetermined radio frequency spectrum band may include a 5 GHz radio frequency spectrum band. In some examples, the predetermined radio frequency spectrum band may include the unlicensed radio frequency spectrum band. In some examples, the means for indicating that the network access device supports the cellular RAT over the unlicensed radio frequency spectrum band may include means for transmitting, in a BCCH, an indication that the network access device supports the cellular RAT over the unlicensed radio frequency spectrum band. In some examples, the method may include means for transmitting an indication of at least one carrier frequency of at least one usable carrier of the cellular RAT over the unlicensed radio frequency spectrum band. In some examples, the apparatus may include means for indicating that a WLAN has a lower priority than a cellular network associated with the cellular RAT. In some examples, the indication that the WLAN has the lower priority than the cellular network may indicate that the WLAN has the lower priority than the cellular network for a class of traffic.

In one example, another apparatus for wireless communication at a network access device is described. The apparatus may include a processor, memory in electronic communication with the processor, and instructions stored in the memory. The instructions may be executable by the processor to indicate that the network access device supports a cellular RAT over an unlicensed radio frequency spectrum band, and to communicate with at least one UE based at least in part on the cellular RAT over the unlicensed radio frequency spectrum band.

In some examples of the apparatus, indicating that the network access device supports the cellular RAT over the unlicensed radio frequency spectrum band may include transmitting a measurement configuration for a predetermined radio frequency spectrum band. In some examples, the predetermined radio frequency spectrum band may include a 5 GHz radio frequency spectrum band. In some examples, the predetermined radio frequency spectrum band may include the unlicensed radio frequency spectrum band. In some examples, indicating that the network access device supports the cellular RAT over the unlicensed radio frequency spectrum band may include transmitting, in a BCCH, an indication that the network access device supports the cellular RAT over the unlicensed radio frequency spectrum band. In some examples, the instructions may be executable by the processor to transmit an indication of at least one carrier frequency of at least one usable carrier of the cellular RAT over the unlicensed radio frequency spectrum band. In some examples, the instructions may be executable by the processor to indicate that a WLAN has a lower priority than a cellular network associated with the cellular RAT. In some examples, the indication that the WLAN has the lower priority than the cellular network may indicate that the WLAN has the lower priority than the cellular network for a class of traffic.

In one example, a computer program product is described. The computer program product may include a non-transitory computer-readable medium. The non-transitory computer-readable medium may include instructions to indicate that a network access device supports a cellular RAT over an unlicensed radio frequency spectrum band, and instructions to communicate with at least one UE based at least in part on the cellular RAT over the unlicensed radio frequency spectrum band.

The foregoing has outlined rather broadly the techniques and technical advantages of examples according to the disclosure in order that the detailed description that follows may be better understood. Additional techniques and advantages will be described hereinafter. The conception and specific examples disclosed may be readily utilized as a basis for modifying or designing other structures for carrying out the same purposes of the present disclosure. Such equivalent constructions do not depart from the scope of the appended claims. Characteristics of the concepts disclosed herein, both their organization and method of operation, together with associated advantages will be better understood from the following description when considered in connection with the accompanying figures. Each of the figures is provided for the purpose of illustration and description, and not as a definition of the limits of the claims.

BRIEF DESCRIPTION OF THE DRAWINGS

A further understanding of the nature and advantages of the present invention may be realized by reference to the following drawings. In the appended figures, similar components or functions may have the same reference label. Further, various components of the same type may be distinguished by following the reference label by a dash and a second label that distinguishes among the similar components. If just the first reference label is used in the specification, the description is applicable to any one of the similar components having the same first reference label irrespective of the second reference label.

FIG. 4 shows an example structure of RAN rules, and indicates the relative settings of a first set of thresholds and a second set of thresholds, in accordance with various aspects of the present disclosure;

FIG. 5 shows an example structure of a modified IE for transmitting RAN rules in a SIB17 or RRC Configuration information, in accordance with various aspects of the present disclosure;

FIG. 6 shows an example structure of a modified SIB17 for transmitting RAN rules, in accordance with various aspects of the present disclosure;

DETAILED DESCRIPTION

Figure 1:
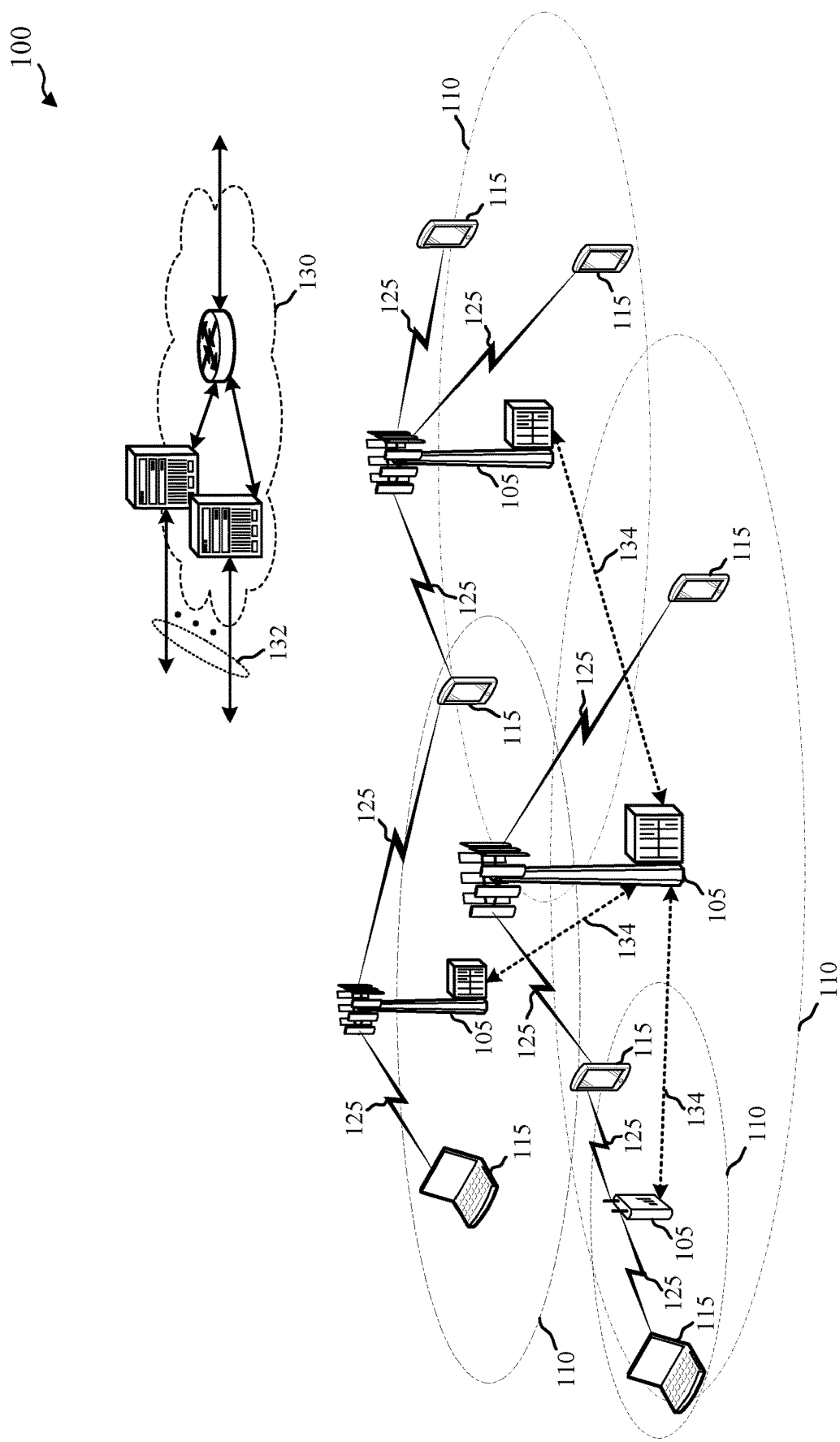
FIG. 1 illustrates an example of a wireless communication system, in accordance with various aspects of the present disclosure.

Techniques are described in which an unlicensed radio frequency spectrum band is used for at least a portion of communications in a wireless communication system. The unlicensed radio frequency spectrum band may be used in combination with, or independent from, a licensed radio frequency spectrum band. The unlicensed radio frequency spectrum band may include a radio frequency spectrum band available for Wi-Fi use, a radio frequency spectrum band available for use by different RATs, or a radio frequency spectrum band available for use by multiple mobile network operators (MNOs) in an equally shared or prioritized manner. In some examples, the unlicensed radio frequency spectrum band may be used for cellular communications (e.g., Long Term Evolution (LTE) or LTE-Advanced (LTE-A) communications, Licensed Assisted Access (LAA) communications, enhanced LAA (eLAA) communications, or MuLTEFire (MF) communications) or WLAN communications. The licensed radio frequency spectrum band may include a radio frequency spectrum band licensed to particular users for particular uses. In some examples, the licensed radio frequency spectrum band may be used for cellular communications (e.g., LTE/LTE-A communications).

Some of the techniques described in the present disclosure enable a UE to determine when both a cellular RAT and a WLAN RAT are available over an unlicensed radio frequency spectrum band, and enable the UE to select one of the cellular RAT or the WLAN RAT for a class of traffic. Some of the techniques described in the present disclosure enable a network access device or other entity to influence (e.g., control) when a UE selects the cellular RAT or the WLAN RAT over the unlicensed radio frequency spectrum band. Currently, the S2b interface, for communication with an evolved packet data gateway (ePDG) over an unlicensed radio frequency spectrum band, has gained significant market traction and is the interface of choice for offloading LTE/LTE-A gateway connections associated with APNs (e.g., a gateway connection associated with an IMS) to an unlicensed radio frequency spectrum band (i.e., to a WLAN RAT over the unlicensed radio frequency spectrum band).

LTE/LTE-A communications (e.g., LAA communications, eLAA communications, and MF communications) over an unlicensed radio frequency spectrum band are now available and/or supported for establishment of gateway connections associated with APNs, and in some cases LTE/LTE-A communications over an unlicensed radio frequency spectrum band may provide better performance than WLAN communications over an unlicensed radio frequency spectrum band. However, current (e.g., IMS) WLAN offload/handover policies and rules do not distinguish the availability of LTE from LTE/LTE-A communications over an unlicensed radio frequency spectrum band.

The following description provides examples, and is not limiting of the scope, applicability, or examples set forth in the claims. Changes may be made in the function and arrangement of elements discussed without departing from the scope of the disclosure. Various examples may omit, substitute, or add various procedures or components as appropriate. For instance, the methods described may be performed in an order different from that described, and various steps may be added, omitted, or combined. Also, features described with respect to some examples may be combined in other examples.

For purposes of the present disclosure, a cellular RAT over an unlicensed radio frequency spectrum band includes, for example, a LAA RAT, an eLAA RAT, a MF RAT, etc. for which a core network of a cellular network allows one or more gateway connections associated with an APN to be established (e.g., initiated, offloaded, or handed over) based at least in part on a RAT over an unlicensed radio frequency spectrum band. A WLAN RAT over an unlicensed radio frequency spectrum band includes, for example, any WLAN RAT that relies on communication with an ePDG (e.g., S2a Mobility based on GTP (SaMOG) or dual stack mobile IP (DSMIP)), etc.

FIG. 1 illustrates an example of a wireless communication system 100, in accordance with various aspects of the present disclosure. The wireless communication system 100 may include base stations 105 (i.e., a type of network access device), UEs 115, and a core network 130. The core network 130 may provide user authentication, access authorization, tracking, Internet Protocol (IP) connectivity, and other access, routing, or mobility functions. The base stations 105 may interface with the core network 130 through backhaul links 132 (e.g., S1, etc.) and may perform radio configuration and scheduling for communication with the UEs 115, or may operate under the control of a base station controller (not shown). In various examples, the base stations 105 may communicate, either directly or indirectly (e.g., through core network 130), with each other over backhaul links 134 (e.g., X1, etc.), which may be wired or wireless communication links.

The base stations 105 may wirelessly communicate with the UEs 115 via one or more base station antennas. Each of the base station 105 sites may provide communication coverage for a respective geographic coverage area 110. In some examples, a base station 105 may be referred to as a network access device, a base transceiver station, a radio base station, an access point, a radio transceiver, a NodeB, an eNodeB (eNB), a Home NodeB, a Home eNodeB, or some other suitable terminology. The geographic coverage area 110 for a base station 105 may be divided into sectors making up a portion of the coverage area (not shown). The wireless communication system 100 may include base stations 105 of different types (e.g., macro or small cell base stations). There may be overlapping geographic coverage areas 110 for different technologies and/or different types of network access devices.

In some examples, the wireless communication system 100 may include an LTE/LTE-A network. In LTE/LTE-A networks, the term evolved Node B (eNB) may be used to describe sets of one or more base stations 105. In some examples, the wireless communication system 100 may be a Heterogeneous LTE/LTE-A network in which different types of eNBs provide coverage for various geographical regions. For example, each eNB or base station 105 may provide communication coverage for a macro cell, a small cell, or other types of cell. The term "cell" is a 3GPP term that can be used to describe a base station, a carrier or component carrier associated with a base station, or a coverage area (e.g., sector, etc.) of a carrier or base station, depending on context.

A macro cell may cover a relatively large geographic area (e.g., several kilometers in radius) and may allow unrestricted access by UEs with service subscriptions with the network provider. A small cell may be a lower-powered base station, as compared with a macro cell that may operate in the same or different (e.g., licensed, unlicensed, etc.) radio frequency spectrum bands as macro cells. Small cells may include pico cells, femto cells, and micro cells according to various examples. A pico cell may cover a relatively smaller geographic area and may allow unrestricted access by UEs with service subscriptions with the network provider. A femto cell also may cover a relatively small geographic area (e.g., a home) and may provide restricted access by UEs having an association with the femto cell (e.g., UEs in a closed subscriber group (CSG), UEs for users in the home, and the like). An eNB for a macro cell may be referred to as a macro eNB. An eNB for a small cell may be referred to as a small cell eNB, a pico eNB, a femto eNB or a home eNB. An eNB may support one or multiple (e.g., two, three, four, and the like) cells (e.g., component carriers).

In some examples of the wireless communication system 100, some or all of the base stations 105 may be replaced by one or more other type of network access device. For example, when the wireless communication system 100 includes a 5G or new radio network, one or more of the base stations 105 may be replaced by a set of radio heads (e.g., smart radio heads) in communication with an access node controller (ANC), with the ANC communicating with other ANCs and/or the core network 130. When the wireless communication system 100 includes a WLAN, one or more of the base stations 105 may be replaced by a WLAN access point.

The wireless communication system 100 may support synchronous or asynchronous operation. For synchronous operation, the base stations 105 may have similar frame timing, and transmissions from different base stations 105 may be approximately aligned in time. For asynchronous operation, the base stations 105 may have different frame timing, and transmissions from different base stations 105 may not be aligned in time. The techniques described herein may be used for either synchronous or asynchronous operations.

The communication networks that may accommodate some of the various disclosed examples may be packet-based networks that operate according to a layered protocol stack. In the user plane, communications at the bearer or Packet Data Convergence Protocol (PDCP) layer may be IP-based. A Radio Link Control (RLC) layer may perform packet segmentation and reassembly to communicate over logical channels. A Medium Access Control (MAC) layer may perform priority handling and multiplexing of logical channels into transport channels. The MAC layer may also use Hybrid ARQ (HARD) to provide retransmission at the MAC layer to improve link efficiency. In the control plane, the Radio Resource Control (RRC) protocol layer may provide establishment, configuration, and maintenance of an RRC connection between a UE 115 and the base stations 105 or core network 130 supporting radio bearers for the user plane data. At the physical (PHY) layer, the transport channels may be mapped to physical channels.

The UEs 115 may be dispersed throughout the wireless communication system 100, and each UE 115 may be stationary or mobile. A UE 115 may also include or be referred to by those skilled in the art as a mobile station, a subscriber station, a mobile unit, a subscriber unit, a wireless unit, a remote unit, a mobile device, a wireless device, a wireless communication device, a remote device, a mobile subscriber station, an access terminal, a mobile terminal, a wireless terminal, a remote terminal, a handset, a user agent, a mobile client, a client, or some other suitable terminology. A UE 115 may be a cellular phone, a personal digital assistant (PDA), a wireless modem, a wireless communication device, a handheld device, a tablet computer, a laptop computer, a cordless phone, a wireless local loop (WLL) station, or the like. A UE 115 may be able to communicate with various types of base stations or other types of network access devices or network equipment, including macro eNBs, small cell eNBs, relay base stations, and the like.

The communication links 125 shown in wireless communication system 100 may include downlinks (DLs), from a base station 105 to a UE 115, and uplinks (ULs), from a UE 115 to a base station 105. The downlinks may also be called forward links, while the uplinks may also be called reverse links.

In some examples, each communication link 125 may include one or more carriers, where each carrier may be a signal made up of multiple sub-carriers (e.g., waveform signals of different frequencies) modulated according to the various radio technologies described above. Each modulated signal may be transmitted on a different sub-carrier and may carry control information (e.g., reference signals, control channels, etc.), overhead information, user data, etc. The communication links 125 may transmit bidirectional communications using a frequency domain duplexing (FDD) operation (e.g., using paired spectrum resources) or a time domain duplexing (TDD) operation (e.g., using unpaired spectrum resources). Frame structures for FDD operation (e.g., frame structure type 1) and TDD operation (e.g., frame structure type 2) may be defined.

In some examples of the wireless communication system 100, base stations 105 or UEs 115 may include multiple antennas for employing antenna diversity schemes to improve communication quality and reliability between base stations 105 and UEs 115. Additionally or alternatively, base stations 105 or UEs 115 may employ multiple-input, multiple-output (MIMO) techniques that may take advantage of multi-path environments to transmit multiple spatial layers carrying the same or different coded data.

In some examples, the wireless communication system 100 may support operation over a licensed radio frequency spectrum band (e.g., a radio frequency spectrum band licensed to particular users for particular uses) or an unlicensed radio frequency spectrum band (e.g., a radio frequency spectrum band that is available for Wi-Fi use, a radio frequency spectrum band that is available for use by different radio access technologies, or a radio frequency spectrum band that is available for use by multiple MNOs in an equally shared or prioritized manner).

Before transmitting over a channel (or cell) of an unlicensed radio frequency spectrum band, a UE 115 may contend for access to the channel using a LBT procedure. Depending on the outcome of the LBT procedure, the UE 115 may or may not be able to transmit over the channel. When the UE 115 determines the channel may be used (e.g., when the UE 115 determines the energy on the channel is below a threshold and "clear"), the UE 115 may transmit over the channel. In some examples, the UE 115 may transmit over the channel using one or more of a plurality of resource interlaces. A resource interlace may include a plurality of frequency resources (e.g., RBs or tones) that are interleaved with (or separated by) one or more other RBs or tones. The frequency resources of a resource interlace may be evenly or unevenly distributed over a transmission bandwidth. In some examples, a 20 MHz or 10 MHz transmission bandwidth (or cell) may include a plurality of resource interlaces having 10 RBs each, with the 10 RBs distributed evenly over the 20 MHz or 10 MHz transmission bandwidth (i.e., at regularly spaced frequency intervals). In other examples, a 5 MHz transmission bandwidth (or cell) may include a plurality of resource interlaces having 5 RBs each, with the 5 RBs distributed evenly over the 5 MHz transmission bandwidth.

In some examples, the wireless communication system 100 may support operation on multiple cells or carriers, a feature which may be referred to as carrier aggregation (CA), or dual-connectivity operation. A carrier may also be referred to as a component carrier (CC), a layer, a channel, etc. The terms "carrier," "component carrier," "cell," and "channel" may be used interchangeably herein. Carrier aggregation may be used with both FDD and TDD component carriers. A CC may be established in a licensed radio frequency spectrum band or an unlicensed radio frequency spectrum band. In some examples, CCs may be aggregated within a licensed radio frequency spectrum band or an unlicensed radio frequency spectrum band, but not both. In other examples, one or more CCs from a licensed radio frequency spectrum band and one or more CCs from an unlicensed radio frequency spectrum band may be aggregated.

In an LTE/LTE-A network, a UE 115 may be configured to communicate using several CCs when operating in a carrier aggregation mode or dual-connectivity mode. One or more of the CCs may be configured as a DL CC, and one or more of the CCs may be configured as a UL CC. Also, one of the CCs allocated to a UE 115 may be configured as a primary CC (PCC), and the remaining CCs allocated to the UE 115 may be configured as secondary CCs (SCCs).

In some examples, the wireless communication system 100 may include a cellular network (e.g., a LTE/LTE-A network) and a WLAN network. Network access devices (e.g., base stations 105) of the cellular network and network access devices (e.g., WLAN access points) of the WLAN network may have overlapping coverage areas. The overlapping coverage areas of the cellular and WLAN networks may provide UEs 115 with opportunities to communicate over an unlicensed radio frequency spectrum band using a cellular RAT or a WLAN RAT. In some examples, a network access device (e.g., a base station 105) of the cellular network may broadcast its support of a cellular RAT over the unlicensed radio frequency spectrum band. In other examples, a UE 115 may infer that a network access device of the cellular network supports a cellular RAT over the unlicensed radio frequency spectrum band. In some examples, a UE 115 may be preconfigured with, or may receive via a network access device or other entity, rules that influence (e.g., control) when the UE 115 selects the cellular RAT or the WLAN RAT for communicating over the unlicensed radio frequency spectrum band.

Figure 2:
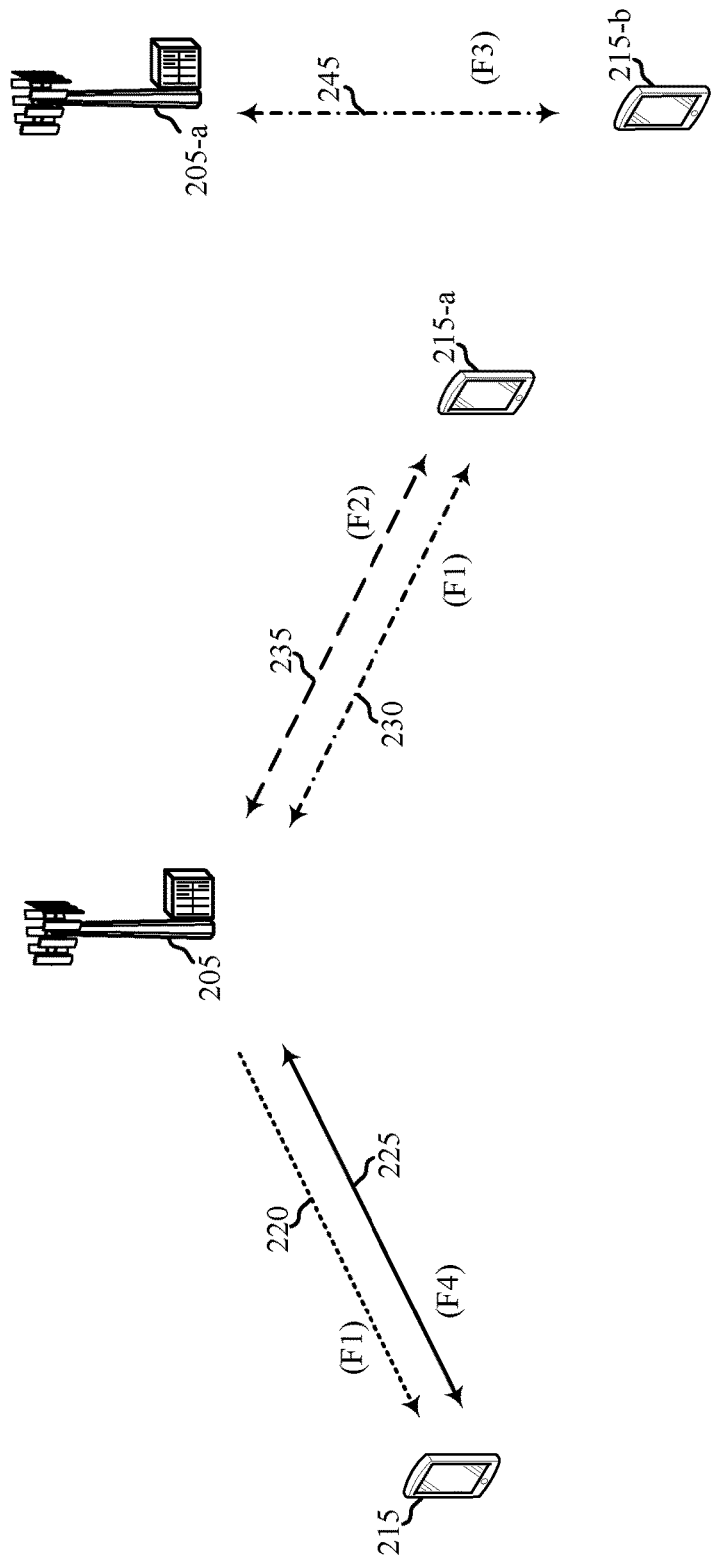
FIG. 2 shows a wireless communication system in which a wireless communication technology may be deployed under different scenarios using an unlicensed radio frequency spectrum band, in accordance with various aspects of the present disclosure.

FIG. 2 shows a wireless communication system 200 in which a wireless communication technology may be deployed under different scenarios using an unlicensed radio frequency spectrum band, in accordance with various aspects of the present disclosure. More specifically, FIG. 2 illustrates examples of a supplemental downlink mode (e.g., a LAA mode), a carrier aggregation mode (e.g., an eLAA mode), and a standalone mode (e.g., a MF mode), in which LTE/LTE-A is deployed using an unlicensed radio frequency spectrum band. The wireless communication system 200 may be an example of portions of the wireless communication system 100 described with reference to FIG. 1. Moreover, a first base station 205 and a second base station 205-*a* may be examples of aspects of one or more of the base stations 105 described with reference to FIG. 1, while a first UE 215, a second UE 215-*a,* and a third UE 215-*b* may be examples of aspects of one or more of the UEs 115 described with reference to FIG. 1.

In the example of the supplemental downlink mode (e.g., the LAA mode) in the wireless communication system 200, the first base station 205 may transmit OFDMA waveforms to the first UE 215 using a downlink channel 220. The downlink channel 220 may be associated with a frequency F1 in an unlicensed radio frequency spectrum band. The first base station 205 may transmit OFDMA waveforms to the first UE 215 using a first bidirectional link 225 and may receive SC-FDMA waveforms from the first UE 215 using the first bidirectional link 225. The first bidirectional link 225 may be associated with a frequency F4 in a licensed radio frequency spectrum band. The downlink channel 220 in the unlicensed radio frequency spectrum band and the first bidirectional link 225 in the licensed radio frequency spectrum band may operate contemporaneously. The downlink channel 220 may provide a downlink capacity offload for the first base station 205. In some examples, the downlink channel 220 may be used for unicast services (e.g., addressed to one UE) or for multicast services (e.g., addressed to several UEs). This scenario may occur with any service provider (e.g., a MNO) that uses a licensed radio frequency spectrum band and needs to relieve some of the traffic or signaling congestion.

In the example of the carrier aggregation mode (e.g., the eLAA mode) in the wireless communication system 200, the first base station 205 may transmit OFDMA waveforms to the second UE 215-*a* using a second bidirectional link 230 and may receive OFDMA waveforms, SC-FDMA waveforms, or resource block interleaved FDMA waveforms from the second UE 215-*a* using the second bidirectional link 230. The second bidirectional link 230 may be associated with the frequency Fl in the unlicensed radio frequency spectrum band. The first base station 205 may also transmit OFDMA waveforms to the second UE 215-*a* using a third bidirectional link 235 and may receive SC-FDMA waveforms from the second UE 215-*a* using the third bidirectional link 235. The third bidirectional link 235 may be associated with a frequency F2 in a licensed radio frequency spectrum band. The third bidirectional link 235 may provide a downlink and uplink capacity offload for the first base station 205. Like the supplemental downlink mode (e.g., the LAA mode) described above, this scenario may occur with any service provider (e.g., MNO) that uses a licensed radio frequency spectrum band and needs to relieve some of the traffic or signaling congestion.

As described above, one type of service provider that may benefit from the capacity offload offered by using LTE/LTE-A in an unlicensed radio frequency spectrum band is a traditional MNO having access rights to an LTE/LTE-A licensed radio frequency spectrum band. For these service providers, an operational example may include a bootstrapped mode (e.g., supplemental downlink, carrier aggregation) that uses the LTE/LTE-A primary component carrier (PCC) on the licensed radio frequency spectrum band and at least one secondary component carrier (SCC) on the unlicensed radio frequency spectrum band.

In the carrier aggregation mode, data and control may, for example, be communicated in the licensed radio frequency spectrum band (e.g., via the third bidirectional link 235) while data may, for example, be communicated in the unlicensed radio frequency spectrum band (e.g., via second bidirectional link 230). The carrier aggregation mechanisms supported when using an unlicensed radio frequency spectrum band may fall under a hybrid frequency division duplexing-time division duplexing (FDD-TDD) carrier aggregation or a TDD-TDD carrier aggregation with different symmetry across component carriers.

In one example of a standalone mode in the wireless communication system 200, the second base station 205-*a* may transmit OFDMA waveforms to the third UE 215-*b* using a bidirectional link 245 and may receive OFDMA waveforms, SC-FDMA waveforms, or resource block interleaved FDMA waveforms from the third UE 215-*b* using the bidirectional link 245. The bidirectional link 245 may be associated with the frequency F3 in the unlicensed radio frequency spectrum band. The standalone mode may be used in non-traditional wireless access scenarios, such as in-stadium access (e.g., unicast, multicast). An example of a type of service provider for this mode of operation may be a stadium owner, cable company, event host, hotel, enterprise, or large corporation that does not have access to a licensed radio frequency spectrum band.

In some examples of the wireless communication system 200, the first UE 215, the second UE 215-*a,* or the third UE 215-*b* may determine that the first base station 205 or second base station 205-*a* supports a cellular RAT (e.g., LAA mode, eLAA mode, or MF mode) over the unlicensed radio frequency spectrum band inferentially. For example, a UE may infer that a base station supports a cellular RAT over the unlicensed radio frequency spectrum band because the UE was previously configured, by the base station, to communicate over the unlicensed radio frequency spectrum band using the cellular RAT. A UE may also infer that a base station supports a cellular RAT over the unlicensed radio frequency spectrum band because the UE receives, from (or for) the network access device, a measurement configuration for a predetermined radio frequency spectrum band. In some examples, the predetermined radio frequency spectrum band may include a 5 GHz radio frequency spectrum band and/or part or all of the unlicensed radio frequency spectrum band.

In some examples of the wireless communication system 200, the first UE 215, the second UE 215-*a,* or the third UE 215-*b* may be influenced (e.g., controlled) by the first base station 205, the second base station 205-*a,* another entity, or pre-configuration information to select a cellular RAT for communication over the unlicensed radio frequency spectrum band. For example, a UE may obtain (e.g., perform or receive) measurements for the unlicensed radio frequency spectrum band, or for carriers used by the cellular RAT in the unlicensed radio frequency spectrum band, and may compare the measurements to one or more preconfigured or received thresholds to determine whether the cellular RAT over the unlicensed radio frequency spectrum band should be selected for wireless communication.

In some examples, a transmitting apparatus such as one of the base stations described with reference to FIG. 1 or 2, or one of the UEs described with reference to FIG. 1 or 2, may use a gating interval to gain access to a wireless channel of an unlicensed radio frequency spectrum band (e.g., to a physical channel of the unlicensed radio frequency spectrum band). In some examples, the gating interval may be synchronous and periodic. For example, the periodic gating interval may be synchronized with at least one boundary of an LTE/LTE-A radio interval. In other examples, the gating interval may be asynchronous. The gating interval may define the application of a sharing protocol, such as an LBT protocol based on the LBT protocol specified in European Telecommunications Standards Institute (ETSI) (EN 301 893). When using a gating interval that defines the application of an LBT protocol, the gating interval may indicate when a transmitting apparatus needs to perform a contention procedure (e.g., an LBT procedure) such as a clear channel assessment (CCA) procedure or an extended CCA (ECCA) procedure. The outcome of the CCA procedure or ECCA procedure may indicate to the transmitting apparatus whether a wireless channel of an unlicensed radio frequency spectrum band is available or in use for the gating interval (e.g., an LBT radio frame or transmission burst). When a CCA procedure or ECCA procedure indicates the wireless channel is available for a corresponding LBT radio frame or transmission burst (e.g., "clear" for use), the transmitting apparatus may reserve or use the wireless channel of the unlicensed radio frequency spectrum band during part or all of the LBT radio frame. When a CCA procedure or ECCA procedure indicates the wireless channel is not available (e.g., that the wireless channel is in use or reserved by another transmitting apparatus), the transmitting apparatus may be prevented from using the wireless channel during the LBT radio frame. In some examples, a transmitting apparatus may need to perform a CCA procedure or ECCA procedure for some but not other wireless channels in an unlicensed radio frequency spectrum band.

Figure 3:
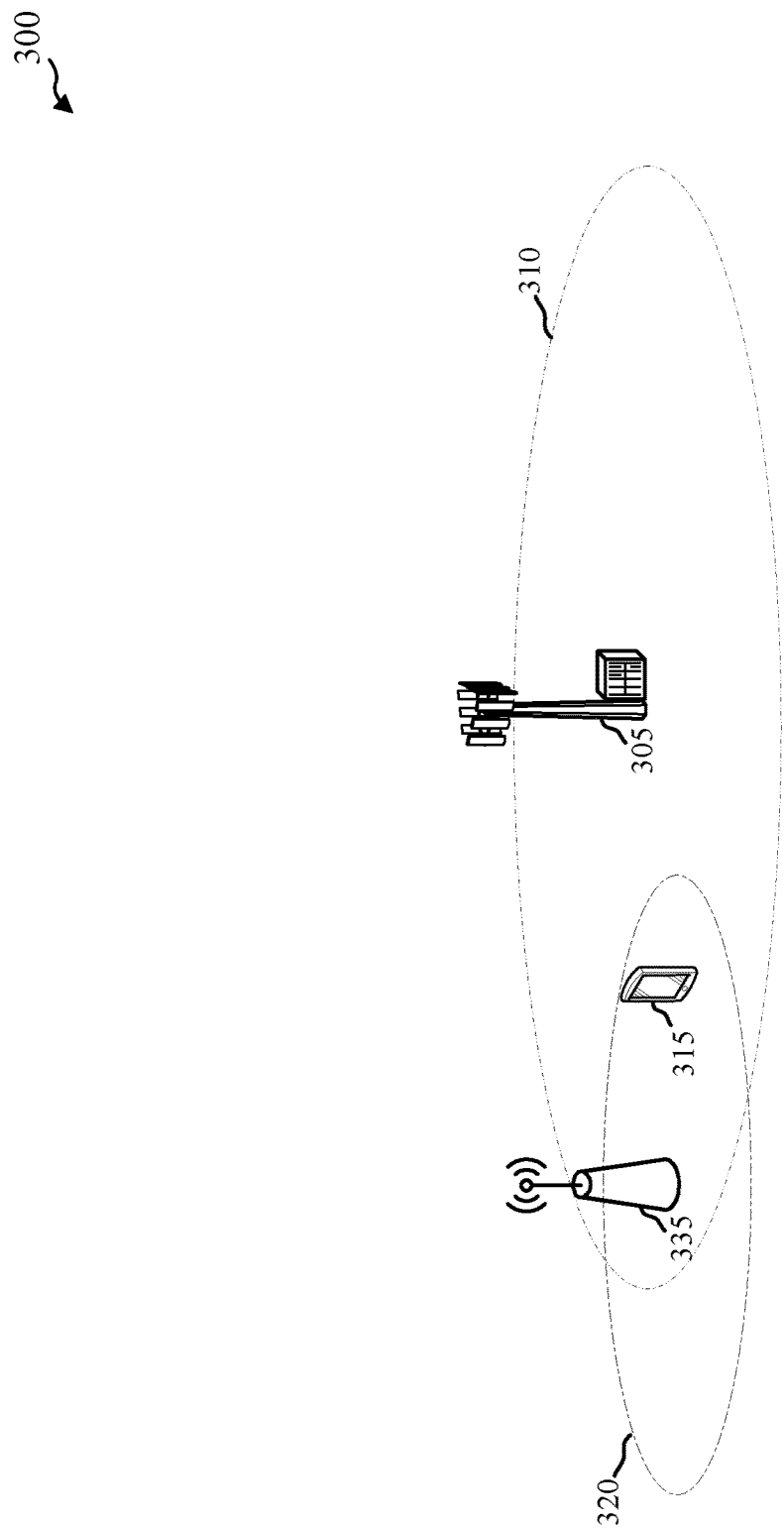
FIG. 3 shows a wireless communication system in which both a cellular RAT and a WLAN RAT over an unlicensed radio frequency spectrum band are available to a UE, in accordance with various aspects of the present disclosure.

FIG. 3 shows a wireless communication system 300 in which both a cellular RAT and a WLAN RAT over an unlicensed radio frequency spectrum band are available to a UE 315, in accordance with various aspects of the present disclosure. The wireless communication system 300 may include a base station 305, an WLAN access point 335, and a UE 315. The base station 305 and UE 315 may be examples of aspects of the base stations 105 and UEs 115 described with reference to FIG. 1.

The base station 305 may support a cellular RAT over an unlicensed radio frequency spectrum band, and in some examples may also support a cellular RAT over a licensed radio frequency spectrum band, within a coverage area 310. In an alternative configuration, the base station 305 may support the cellular RAT over the unlicensed radio frequency spectrum band and the cellular RAT over the licensed radio frequency spectrum band within different coverage areas. The WLAN access point 335 may support a WLAN RAT over the unlicensed radio frequency spectrum band. The WLAN RAT over the unlicensed radio frequency spectrum band may be supported within a coverage area 320. In some examples, the UE 315 may be within both of the coverage areas 310 and 320.

In some examples of the wireless communication system 300, a gateway connection associated with an APN may be established over the licensed radio frequency spectrum band. For example, a gateway connection may be established based at least in part on the cellular RAT (e.g., a voice over LTE (VoLTE) RAT) over the licensed radio frequency spectrum band. A gateway connection established over the licensed radio frequency spectrum band may have a higher quality than a gateway connection established over the unlicensed radio frequency spectrum band. However, some operators may desire to establish (e.g., initiate, offload, or handover) a gateway connection over the unlicensed radio frequency spectrum band. For example, an operator may establish a gateway connection based at least in part on the cellular RAT (e.g., a LTE RAT based at least in part on eLAA, etc.) or the WLAN RAT (e.g., a VoWLAN RAT using ePDG, etc.) over the unlicensed radio frequency spectrum band.

Some operators may desire to establish a gateway connection based at least in part on the cellular RAT over the unlicensed radio frequency spectrum band, instead of the WLAN RAT over the unlicensed radio frequency spectrum band, because Quality of Service (QoS) for the cellular RAT can be controlled by a network access device (e.g., by the base station 305). QoS may be controlled using hybrid automatic repeat request (HARQ), radio link control (RLC), unacknowledged mode (UM), uplink (UL) prioritization, and scheduled uplink. A gateway connection based at least in part on the cellular RAT over the unlicensed radio frequency spectrum band may also provide a controlled connected mode discontinuous reception (CDRX) cycle (whereas WLAN power save may be proprietary and problematic); network access device selection and positioning of channels/carriers; an absence of the uncertainty of WLAN backhaul or WLAN access; and a reduction of the cost of operation (OPEX) of an ePDG server (toward eventual phase out). A gateway connection based at least in part on the cellular RAT over the unlicensed radio frequency spectrum band may also provide self-scheduling, enabling traffic for a gateway connection (e.g., VoIP traffic) to be handled mostly inside a SCC (with PUCCH/PRACH on a PCC, for example).

Unless the UE 315 is currently in an RRC connected state with the base station 305, and is configured in a CA mode using one or more CCs in the unlicensed radio frequency spectrum band, the UE 315 may need to determine that the base station 305 supports the cellular RAT in the unlicensed radio frequency spectrum band before determining whether to establish a gateway connection based at least in part on the cellular RAT or the WLAN RAT over the unlicensed radio frequency spectrum band. In some examples, the UE 315 may determine that the base station 305 supports the cellular RAT in the unlicensed radio frequency spectrum band based at least in part on one or more inferences. For example, each time the UE 315 is configured to communicate over the unlicensed radio frequency spectrum band based at least in part on the cellular RAT, the UE 315 may save an identifier of the network access device (e.g., base station) that configured the UE 315 to communicate over the unlicensed radio frequency spectrum band based at least in part on the cellular RAT. Also or alternatively, the UE 315 may save a physical cell identity (PCI) associated with each network access device that configures the UE 315 to communicate over the unlicensed radio frequency spectrum band. When the UE 315 accesses a network access device, the UE 315 may determine whether an identifier or PCI associated with the network access device has been saved. Based at least in part on determining that an identifier or PCI associated with a network access device has been saved, the UE 315 may determine whether to establish a gateway connection based at least in part on a cellular RAT over the unlicensed radio frequency spectrum band.

In another example, the UE 315 may determine whether the base station 305 supports a cellular RAT over the unlicensed radio frequency spectrum band based at least in part on whether the UE 315 receives, from the base station 305, a measurement configuration (e.g., for a downlink channel) for a predetermined radio frequency spectrum band. In some examples, the predetermined radio frequency spectrum band may include a 5 GHz radio frequency spectrum band and/or part or all of the unlicensed radio frequency spectrum band. One potential limitation of this inference is that a measurement configuration for a downlink channel may not necessarily imply that the base station 305 supports communication on an uplink channel based at least in part on the cellular RAT over the unlicensed radio frequency spectrum band. Thus, a UE that attempts to establish a bidirectional gateway connection based at least in part on the cellular RAT over the unlicensed radio frequency spectrum band may discover that the base station 305 does not support communication on an uplink channel based at least in part on the cellular RAT over the unlicensed radio frequency spectrum band.

In another example, the UE 315 may determine whether the base station 305 supports a cellular RAT over the unlicensed radio frequency spectrum band based at least in part on whether the UE 315 receives, from the base station 305, system information including radio access network (RAN) rules, which RAN rules include at least one threshold for selecting the cellular RAT over the unlicensed radio frequency spectrum band based on measurements.

In some examples, the UE 315 may determine that the base station 305 supports the cellular RAT in the unlicensed radio frequency spectrum band based at least in part on an explicit indication received from the base station 305. In some examples, the explicit indication may be received in a BCCH (e.g., a single-bit indication in a BCCH). In some examples, the explicit indication may be received in system information broadcast or transmitted by the base station 305, or provisioned on the UE 315 via a database or configuration file.

Upon determining that the WLAN access point 335 supports the WLAN RAT over the unlicensed radio frequency spectrum band, the UE 315 may obtain (e.g., perform or receive) measurements for the WLAN RAT over the unlicensed radio frequency spectrum band. Upon determining that the base station 305 supports the cellular RAT over the unlicensed radio frequency spectrum band, the UE 315 may obtain (e.g., perform or receive) measurements for the cellular RAT over the unlicensed radio frequency spectrum band. The UE 315 may also obtain (e.g., perform or receive) measurements for the cellular RAT over the licensed radio frequency spectrum band.

In some examples, the base station 305 may transmit an indication of at least one usable carrier of the cellular RAT over the unlicensed radio frequency spectrum band, and the UE 315 may obtain measurements for the at least one usable carrier (e.g., at least one usable SCC). In some examples, the indication of the at least one usable carrier may include an indication of the carrier frequency(ies) of the at least one usable carrier. In some examples, the indication of the at least one usable carrier may be included in one or both of system information (e.g., in a BCCH) or unicast information transmitted by the base station 305. In some examples, the base station 305, WLAN access point 335, or UE 315 may select a carrier (channel) or usable carrier, based at least in part on a bandwidth used for the cellular RAT over the unlicensed radio frequency spectrum band or the WLAN RAT over the unlicensed radio frequency spectrum band. For example, when the UE 315 operates as a soft AP or peer-to-peer group owner (P2P GO), the UE 315 may select a WLAN channel in the unlicensed radio frequency spectrum band based at least in part on a bandwidth used for the cellular RAT over the unlicensed radio frequency spectrum band.

In some examples, the measurements obtained for the cellular RAT over the licensed radio frequency spectrum band, on the cellular RAT over the unlicensed radio frequency spectrum band, and/or on the WLAN RAT over the unlicensed radio frequency spectrum band may include at least one of power (e.g., RSRP) or quality (e.g., RSRQ) measurements.

After determining that both a cellular RAT and a WLAN RAT over an unlicensed radio frequency spectrum band are available, and obtaining measurements on at least one of the cellular RAT or the WLAN RAT over the unlicensed radio frequency spectrum band (and in some examples, on usable carriers of the cellular RAT or WLAN RAT over the unlicensed radio frequency spectrum band), the UE 315 may select one of the cellular RAT or the WLAN RAT over the unlicensed radio frequency spectrum band for establishing a gateway connection associated with an APN. Alternatively, and when a cellular RAT over a licensed radio frequency spectrum band is available, the UE 315 may choose to establish or maintain the gateway connection based at least in part on the cellular RAT over the licensed radio frequency spectrum band. In some examples, the cellular RAT or the WLAN RAT over the unlicensed radio frequency spectrum band may be selected based at least in part on a comparison of the measurements to one or more thresholds. In addition to selecting the cellular RAT or the WLAN RAT over the unlicensed radio frequency spectrum band, and in some examples, a best carrier of the selected RAT may be considered (e.g., when multiple carriers of the selected RAT satisfy the one or more thresholds, or in order to perform a comparison against a threshold). In some examples, the thresholds may be indicated to the UE 315 in one or more rules that indicate when the gateway connection may or should be established based at least in part on the cellular RAT or the WLAN RAT over the unlicensed radio frequency spectrum band.

In some examples, a same set of thresholds may be indicated for both the cellular RAT and the WLAN RAT over the unlicensed radio frequency spectrum band, and measurements on both the cellular RAT and the WLAN RAT over the unlicensed radio frequency spectrum band may be compared to the same set of thresholds. Assuming the measurements on the cellular RAT and the WLAN RAT over the unlicensed radio frequency spectrum band both satisfy the thresholds, the cellular RAT or the WLAN RAT over the unlicensed radio frequency spectrum band may be selected based at least in part on a preconfigured or dynamically indicted RAT selection preference. In some examples, the RAT selection preference may be dynamically indicated by the base station 305 (e.g., in system information, such as system information transmitted in a BCCH).

In other examples, a first set of one or more thresholds may be indicated for the cellular RAT over the unlicensed radio frequency spectrum band, and a second set of one or more thresholds may be indicated for the WLAN RAT over the unlicensed radio frequency spectrum band. Measurements on the cellular RAT over the unlicensed radio frequency spectrum band may be compared to the first set of one or more thresholds, and measurements on the WLAN RAT over the unlicensed radio frequency spectrum band may be compared to the second set of one or more thresholds. In some examples, the first and/or second set of one or more thresholds may be set to bias the UE's selection of a RAT toward selection of the cellular RAT over the WLAN RAT, or to bias the UE's selection of a RAT toward selection of the WLAN RAT over the cellular RAT.

In some examples, a set of one or more thresholds may also be indicated for the cellular RAT over the licensed radio frequency spectrum band, and a selection of the cellular RAT or the WLAN RAT over the unlicensed radio frequency spectrum band may depend on comparisons of measurements obtained for the cellular RAT over the licensed radio frequency spectrum band to the set of one or more thresholds for the cellular RAT over the licensed radio frequency spectrum band. For example, the cellular RAT or the WLAN RAT over the unlicensed radio frequency spectrum band may only be selected for establishing a gateway connection when the channel power and/or quality of the cellular RAT over the licensed radio frequency spectrum band drops below a predetermined threshold, and otherwise, the gateway connection may be established or maintained based at least in part on the cellular RAT over the licensed radio frequency spectrum band.

In some examples, RAN rules may include one or more thresholds, and may indicate when the UE 315 may establish the gateway connection based at least in part on the cellular RAT or the WLAN RAT over the unlicensed radio frequency spectrum band. For example, 3GPP Release 13 RAN rules include RAN rules in a SIB17. The RAN rules in the SIB17 may include thresholds that indicate when a UE may establish a gateway connection based at least in part on a WLAN RAT over an unlicensed radio frequency spectrum band. The RAN rules included in the SIB17 are based on measurements obtained (e.g., performed or received) for a cellular RAT over a licensed radio frequency spectrum band (e.g., measurements obtained for a PCC), and measurements obtained for a WLAN RAT over an unlicensed radio frequency spectrum band. In some examples, the thresholds that indicate when a UE may establish a gateway connection based at least in part on the WLAN RAT over an unlicensed radio frequency spectrum band may be set very high, based on an assumption that measurements on the cellular RAT over the unlicensed radio frequency spectrum band may at times satisfy the very high thresholds, but measurements on the WLAN RAT over the unlicensed radio frequency spectrum band will not satisfy the very high thresholds. Thus, the very high thresholds may bias a UE's selection of a RAT toward selection of the cellular RAT over the unlicensed radio frequency spectrum band. However, when such very high thresholds are used in a wireless communication system including some UEs that are configured to communicate based at least in part on the cellular RAT over the unlicensed radio frequency spectrum band and other UEs that are not configured to communicate based at least in part on the cellular RAT over the unlicensed radio frequency spectrum band, the very high thresholds may unfairly deter the UEs that are not configured to communicate based at least in part on the cellular RAT over the unlicensed radio frequency spectrum band from establishing a gateway connection over the WLAN RAT over the unlicensed radio frequency spectrum band.

In some examples, RAN rules (e.g., the RAN rules in the SIB17) may be augmented to include an additional set of RAN rules, including one or more thresholds for selecting the cellular RAT or the WLAN RAT over the unlicensed radio frequency spectrum band. In some examples, the UE 315 may interpret receipt of a SIB17 including the additional set of RAN rules (including the additional one or more thresholds), from the base station 305, as an indication that the base station 305 supports the cellular RAT over the unlicensed radio frequency spectrum band. In some examples, a UE that is configured to communicate based at least in part on the cellular RAT over the unlicensed radio frequency spectrum band may apply the additional set of one or more thresholds to measurements, and a UE that is not configured to communicate based at least in part on the cellular RAT over the unlicensed radio frequency spectrum band may apply the legacy set of one or more thresholds to measurements.

FIG. 4 shows an example structure of RAN rules 400, and indicates the relative settings of a first set of thresholds and a second set of thresholds, in accordance with various aspects of the present disclosure. The first set of thresholds may be used in RAN rules for selecting between a cellular RAT over a licensed radio frequency spectrum band and a WLAN RAT over an unlicensed radio frequency spectrum band, and the second set of thresholds may be used in RAN rules for selecting between a cellular RAT and the WLAN RAT over the unlicensed radio frequency spectrum band.

By way of example, each set of thresholds may include a set of E-UTRAN serving cell thresholds 405 and a set of target WLAN access point thresholds 410. The E-UTRAN serving cell thresholds 405 may include a WLAN offload minimum RSRP threshold (e.g., $Thresh_{ServingOffloadWLAN,LowP}$ 415) to which a RSRP measurement (e.g., RSRPmeas 420) of the cellular RAT (or each usable carrier of the cellular RAT) over the unlicensed radio frequency spectrum band is compared, and a WLAN offload minimum RSRQ threshold (e.g., $Thresh_{ServingoffloadWLAN,LowQ}$ 425) to which a RSRQ measurement (e.g., RSRQmeas 430) of the cellular RAT (or each usable carrier of the cellular RAT) over the unlicensed radio frequency spectrum band is compared. The target WLAN access point thresholds 410 may include a WLAN minimum channel utilization threshold (e.g., $Thresh_{ChUtilWLAN, Low}$ 435) to which a channel utilization measurement (e.g., ChannelUtilizationWLAN 440) of the WLAN RAT over the unlicensed radio frequency spectrum band is compared; a WLAN maximum downlink (DL) backhaul rate (e.g., $Thresh_{BackhRateULWLAN, High}$ 445) to which a DL backhaul rate measurement (e.g., BackhaulRateDLWLAN 450) of the WLAN RAT over the unlicensed radio frequency spectrum band is compared; a WLAN maximum uplink (UL) backhaul rate (e.g., $Thresh_{BackhRateULWLAN}, High$ 455) to which a UL backhaul rate measurement (e.g., BackhaulRateULWLAN 460) of the WLAN RAT over the unlicensed radio frequency spectrum band is compared; and a WLAN maximum RSSI threshold (e.g., $Thresh_{WLANRSSI, High}$ 465) to which a RSSI measurement (e.g., WLANRSSI 470) of the WLAN RAT over the unlicensed radio frequency spectrum band is compared.

If either measurement of the E-UTRAN serving cell thresholds 405 satisfies its respective threshold (or in some cases, if both measurements satisfy their respective thresholds), and/or either measurement of the target WLAN access point thresholds 410 satisfies its respective threshold (or in some cases, if all measurements satisfy their respective thresholds), a UE may select the WLAN RAT over the unlicensed radio frequency spectrum band for establishing a gateway connection associated with an APN. Otherwise, the UE may establish or maintain the gateway connection based at least in part on the cellular RAT over the licensed radio frequency spectrum band or the cellular RAT over the unlicensed radio frequency spectrum band.

The second set of thresholds may include versions of the E-UTRAN serving cell thresholds 405 and target WLAN access point thresholds 410 in which the minimum thresholds are set lower and the maximum thresholds are set higher than in the first set of thresholds. In some examples, the same set of target WLAN access point thresholds 410 may be used for each of the first and second sets of thresholds. When none of the E-UTRAN serving cell thresholds 405 in the first set of thresholds are satisfied, a UE may establish or maintain a gateway connection based at least in part on the cellular RAT over the licensed radio frequency spectrum band. When at least one (or in some examples, all) of the E-UTRAN serving cell thresholds 405 in the first set of thresholds is satisfied, a UE may establish or maintain a gateway connection based at least in part on the cellular RAT over the unlicensed radio frequency spectrum band, unless at least one (or in some examples, all) of the E-UTRAN serving cell thresholds 405 in the second set of thresholds is satisfied and at least one (or in some examples, all) of the target WLAN access point thresholds 410 is satisfied. In this manner, a RAT selection priority may be established, in which the cellular RAT over the licensed radio frequency spectrum band is given first priority, the cellular RAT over the unlicensed radio frequency spectrum band is given second priority, and the WLAN RAT over the unlicensed radio frequency spectrum band is given third priority. In other examples, other priorities may be established.

The RAN rules included in SIB17 are currently included in a wlan-OffloadConfigCommon information element (IE). A similar IE may be used to transmit RAN rules in RRC Configuration information (e.g., in a rrcConnectionReconfiguration), to a selected UE.

FIG. 5 shows an example structure of a modified IE 500 for transmitting RAN rules in a SIB17 or RRC Configuration information, in accordance with various aspects of the present disclosure. As shown, the modified IE 500 may include a first set of E-UTRAN serving cell thresholds 505 for selecting between a cellular RAT over a licensed radio frequency spectrum band and a WLAN RAT over an unlicensed radio frequency spectrum band, a second set of E-UTRAN serving cell thresholds 510 for selecting between a cellular RAT and the WLAN RAT over the unlicensed radio frequency spectrum band, and a set of target WLAN access point thresholds 515 for selecting the WLAN RAT over the unlicensed radio frequency spectrum band. The first set of E-UTRAN serving cell thresholds 505 and second set of E-UTRAN serving cell thresholds 510 may be examples of the E-UTRAN serving cell thresholds 405 described with reference to FIG. 4, and the target WLAN access point thresholds 515 may be an example of the target WLAN access point thresholds 410 described with reference to FIG. 4.

In FIG. 5, the set of target WLAN access point thresholds 515 may be evaluated in conjunction with evaluating the first set of E-UTRAN serving cell thresholds 505 or the second set of E-UTRAN serving cell thresholds 510. This may reduce the size of the IE 500, but at the expense of less flexibility. In some examples, receipt of the IE 500 including the second set of E-UTRAN serving cell thresholds 510, from a network access device, may indicate to a UE that the network access device supports the cellular RAT over the unlicensed radio frequency spectrum band.

FIG. 6 shows an example structure of a modified SIB17 600 for transmitting RAN rules, in accordance with various aspects of the present disclosure. As shown, the modified SIB17 600 may include a first set of thresholds (e.g., in a first IE, such as a wlan-OffloadConfigCommon IE 605) and a second set of thresholds (e.g., in a second IE, such as a wlan-OffCnfgCommon IE 610). The first set of thresholds may be used in RAN rules for selecting between a cellular RAT over a licensed radio frequency spectrum band and a WLAN RAT over an unlicensed radio frequency spectrum band, and the second set of thresholds may be used in RAN rules for selecting between a cellular RAT and the WLAN RAT over the unlicensed radio frequency spectrum band. In some examples, the first set of thresholds may include a first set of E-UTRAN serving cell thresholds and a first set of target WLAN access point thresholds, and the second set of thresholds may include a second set of E-UTRAN serving cell threshold and a second set of target WLAN access point thresholds. The first and second sets of E-UTRAN serving cell thresholds may be examples of the E-UTRAN serving cell thresholds 405 described with reference to FIG. 4, and the first and second sets of target WLAN access point thresholds may be examples of the target WLAN access point thresholds 410 described with reference to FIG. 4.

In some examples, receipt of the SIB17 600 including the second set of thresholds, from a network access device, may indicate to a UE that the network access device supports the cellular RAT over the unlicensed radio frequency spectrum band.

In some examples, a UE may determine whether to select a cellular RAT or WLAN RAT over an unlicensed radio frequency spectrum band, for establishment of a gateway connection associated with an APN, based at least in part on ANDSF rules. In some examples, ANDSF rules may be applied in the absence of RAN rules. A UE may receive the ANDSF rules in an ANDSF management object (e.g., an extensible markup language (XML) file), as described in 3GPP TS 24.312 for example. The ANDSF rules may include thresholds similar to those included in RAN rules, and may be augmented to include the additional rules and/or thresholds described with reference to FIG. 3, 4, 5, or 6 for selecting between a cellular RAT and the WLAN RAT over the unlicensed radio frequency spectrum band.

In some examples, a behavior equivalent to the behavior associated with the RAN rules or the ANDSF rules may be achieved via one or more proprietary configuration files and/or policies.

Figure 7:
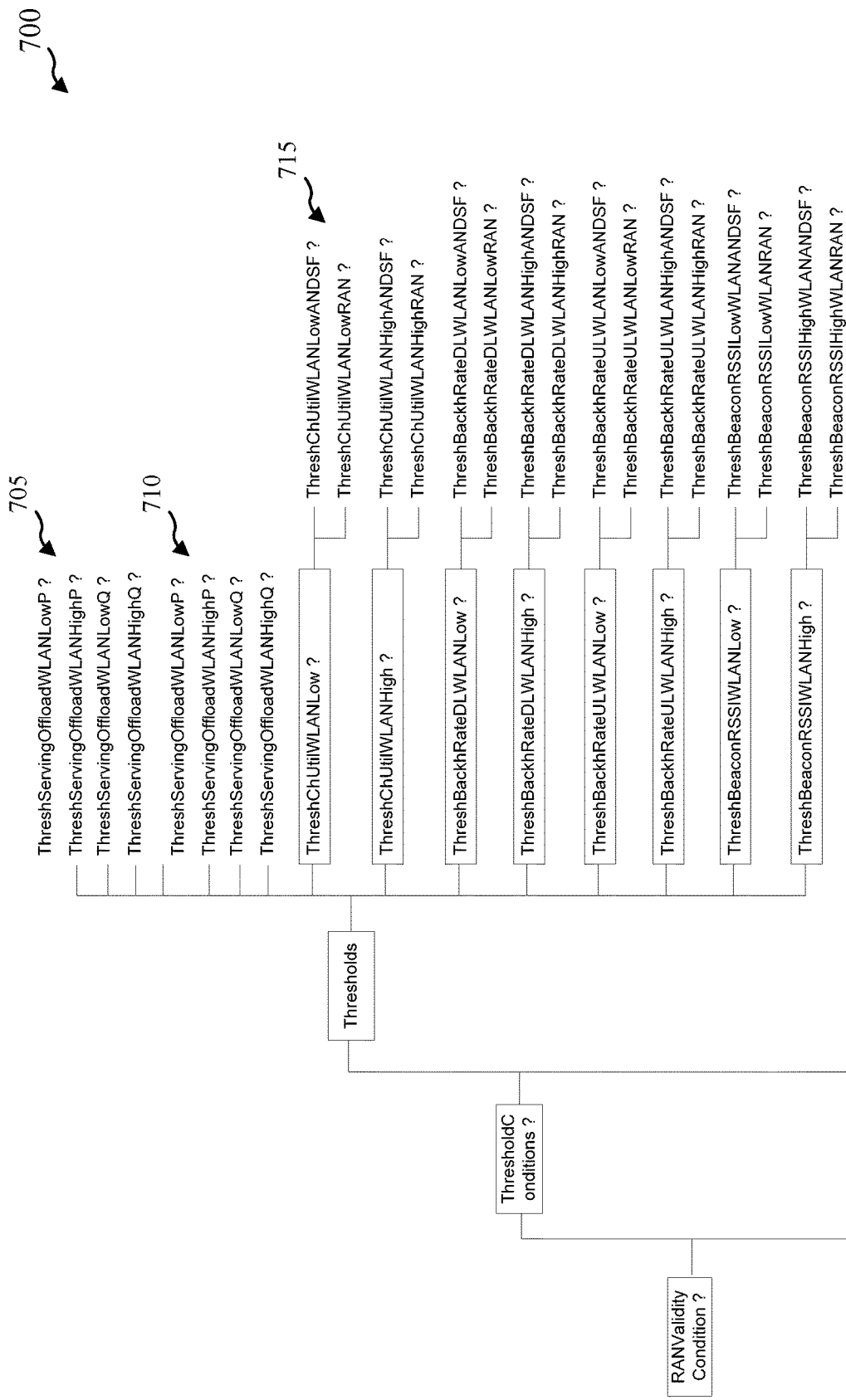
FIG. 7 shows an example structure of a modified ANDSF management object for transmitting ANDSF rules, in accordance with various aspects of the present disclosure.

FIG. 7 shows an example structure of a modified ANDSF management object 700 for transmitting ANDSF rules, in accordance with various aspects of the present disclosure. As shown, the modified ANDSF management object 700 may include a first set of E-UTRAN serving cell thresholds 705 for selecting between a cellular RAT over a licensed radio frequency spectrum band and a WLAN RAT over an unlicensed radio frequency spectrum band, a second set of E-UTRAN serving cell thresholds 710 for selecting between a cellular RAT and the WLAN RAT over the unlicensed radio frequency spectrum band, and a set of target WLAN access point thresholds 715 for selecting the WLAN RAT over the unlicensed radio frequency spectrum band. The first set of E-UTRAN serving cell thresholds 705 and second set of E-UTRAN serving cell thresholds 710 may be examples of the E-UTRAN serving cell thresholds 405 described with reference to FIG. 4, and the target WLAN access point thresholds 715 may be an example of the target WLAN access point thresholds 410 described with reference to FIG. 4.

In an alternative configuration of the modified ANDSF management object 700, an additional set of target WLAN access point thresholds may be included in the modified ANDSF management object 700, with a first set of target WLAN access point thresholds being provided for use when selecting between the cellular RAT over the licensed radio frequency spectrum band and the WLAN RAT over the unlicensed radio frequency spectrum band, and a second set of target WLAN access point thresholds being provided for use when selecting between a cellular RAT and the WLAN RAT over the unlicensed radio frequency spectrum band.

In some examples, RAN rules may be preferable to ANDSF rules in that the thresholds included in RAN rules may be changed more frequently than the thresholds in ANDSF rules.

In some examples, a MNO may configure its network to support concurrent communication based at least in part on a cellular RAT over a first unlicensed radio frequency spectrum band, and based at least in part on a WLAN RAT over a second unlicensed radio frequency spectrum band. The concurrent communication may be between a network access device and a UE, or between a network access device and multiple UEs (e.g., with different UEs communicating over the first or second unlicensed radio frequency spectrum band using one or the other of the cellular RAT or the WLAN RAT). In some examples, communication based at least in part on a cellular RAT may be supported over a 5 GHz unlicensed radio frequency spectrum band, and communication based at least in part on a WLAN RAT may be supported over a 2.4 GHz unlicensed radio frequency spectrum band.

In some examples, a MNO (or network access device) that supports concurrent communication based at least in part on a cellular RAT over a first unlicensed radio frequency spectrum band, and based at least in part on a WLAN RAT over a second unlicensed radio frequency spectrum band, may signal (e.g., to UEs) when a WLAN network (e.g., an operator-deployed WLAN network used for nonseamless WLAN offload (NSWO)) has a lower priority than a cellular network (e.g., a cellular network over an unlicensed radio frequency spectrum band). In this manner, the signaling may influence which of the networks a UE (e.g., a UE that is capable of operating over both the cellular RAT over the first unlicensed radio frequency spectrum band and the WLAN RAT over the second unlicensed radio frequency spectrum band) selects for establishment of services (e.g., a gateway connection associated with an APN, such as an Internet packet data network (PDN)). For example, a UE may be configured to select a higher priority network (over an unlicensed radio frequency spectrum band) when a lower priority network and a higher priority network are available to the UE. In some examples, the UE may internally prevent a connection to a WLAN (or servicing of a class of service over the WLAN) when the WLAN has been indicated to be of lower priority, and when a cellular RAT over an unlicensed radio frequency spectrum band is determined to be available.

Figure 8:
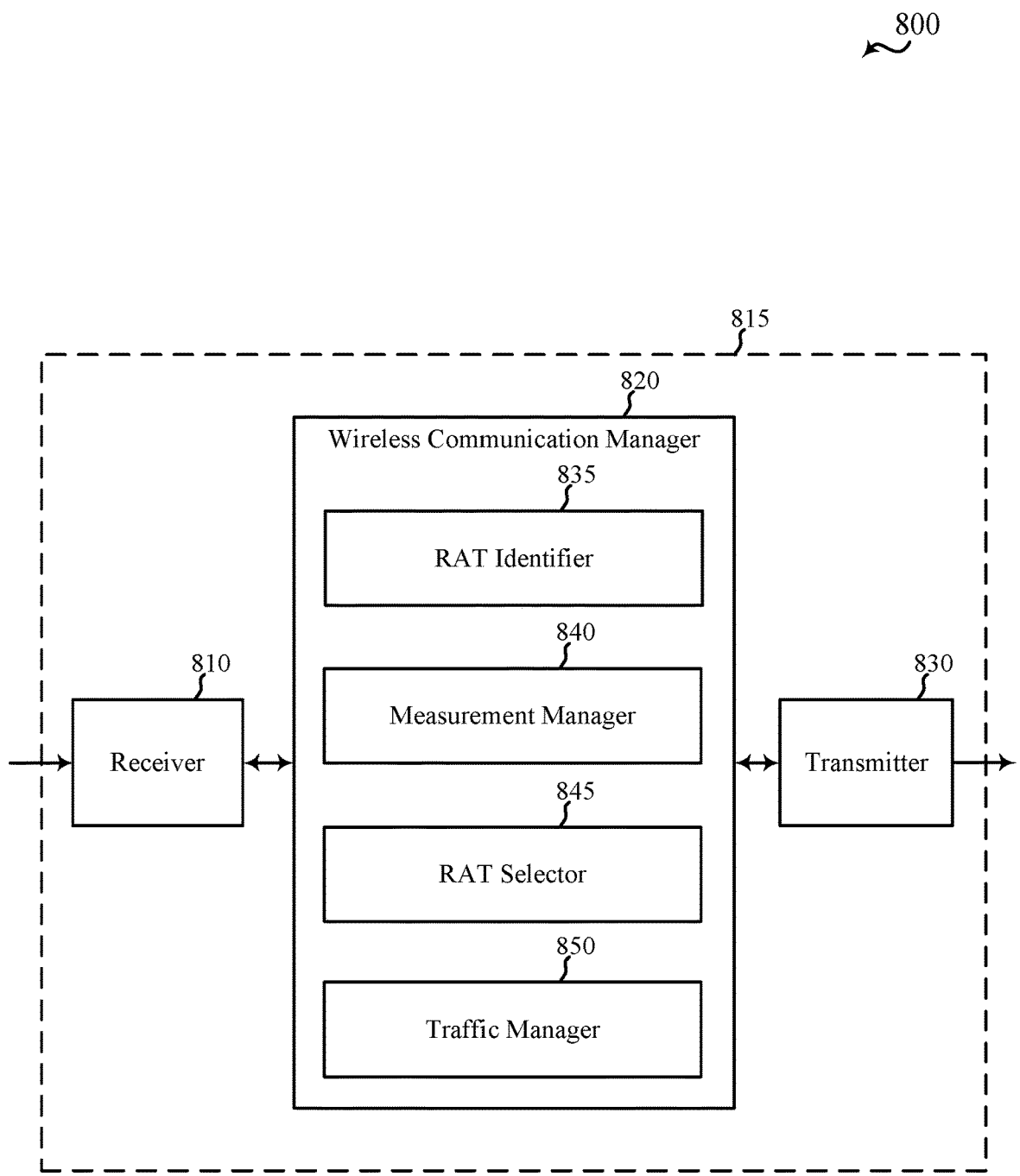
FIG. 8 shows a block diagram of an apparatus for use in wireless communication, in accordance with various aspects of the present disclosure.

FIG. 8 shows a block diagram 800 of an apparatus 815 for use in wireless communication, in accordance with various aspects of the present disclosure. The apparatus 815 may be an example of aspects of one or more of the UEs described with reference to FIG. 1, 2, or 3. The apparatus 815 may also be or include a processor. The apparatus 815 may include a receiver 810, a wireless communication manager 820, or a transmitter 830. Each of these components may be in communication with each other.

The components of the apparatus 815 may, individually or collectively, be implemented using one or more application-specific integrated circuits (ASICs) adapted to perform some or all of the applicable functions in hardware. Alternatively, the functions may be performed by one or more other processing units (or cores), on one or more integrated circuits. In other examples, other types of integrated circuits may be used (e.g., Structured/Platform ASICs, Field Programmable Gate Arrays (FPGAs), a System-on-Chip (SoC), and/or other types of Semi-Custom ICs), which may be programmed in any manner known in the art. The functions of each component may also be implemented, in whole or in part, with instructions embodied in a memory, formatted to be executed by one or more general or application-specific processors.

In some examples, the receiver 810 may include at least one radio frequency (RF) receiver, such as at least one RF receiver operable to receive transmissions over a licensed radio frequency spectrum band (e.g., a radio frequency spectrum band licensed to particular users for particular uses) or an unlicensed radio frequency spectrum band (e.g., a radio frequency spectrum band available for Wi-Fi use, a radio frequency spectrum band available for use by different radio access technologies, or a radio frequency spectrum band available for use by multiple MNOs in an equally shared or prioritized manner). In some examples, the licensed radio frequency spectrum band or the unlicensed radio frequency spectrum band may be used for LTE/LTE-A communications, as described, for example, with reference to FIG. 1, 2, 3, 4, 5, 6, or 7. The receiver 810 may be used to receive various types of data or control signals (i.e., "data" or transmissions) over one or more communication links of a wireless communication system, such as one or more communication links of the wireless communication system 100 or 200 described with reference to FIG. 1 or 2. The communication links may be established over the licensed radio frequency spectrum band or the unlicensed radio frequency spectrum band.

In some examples, the transmitter 830 may include at least one RF transmitter, such as at least one RF transmitter operable to transmit over the licensed radio frequency spectrum band or the unlicensed radio frequency spectrum band. The transmitter 830 may be used to transmit various types of data or control signals (i.e., "data" or transmissions) over one or more communication links of a wireless communication system, such as one or more communication links of the wireless communication system 100 or 200 described with reference to FIG. 1 or 2. The communication links may be established over the licensed radio frequency spectrum band or the unlicensed radio frequency spectrum band.

In some examples, the wireless communication manager 820 may be used to manage one or more aspects of wireless communication for the apparatus 815. In some examples, part of the wireless communication manager 820 may be incorporated into or shared with the receiver 810 or the transmitter 830. In some examples, the wireless communication manager 820 may include a RAT identifier 835, a measurement manager 840, a RAT selector 845, or a traffic manager 850.

The RAT identifier 835 may be used to determine whether both a cellular RAT and a WLAN RAT are available over an unlicensed radio frequency spectrum band. The measurement manager 840 may be used to obtain measurements (e.g., perform measurements or receive measurements) for at least the cellular RAT or the WLAN RAT. In some examples, obtaining the measurements may include determining at least one of a RSRP, a RSRQ, or a combination thereof. The RAT selector 845 may be used to selecting one of the cellular RAT or the WLAN RAT for a class of traffic. The selected RAT may be selected based at least in part on the measurements. The traffic manager 850 may be used to serve the class of traffic based at least in part on the selected RAT. In some examples, the class of traffic may include a gateway connection associated with an APN, and serving the class of traffic may include at least one of initiating the gateway connection, offloading the gateway connection, or performing a handover of the gateway connection. In some examples, the class of traffic may include all of the traffic routed to a default route by the operating system, such as Internet traffic.

Figure 9:
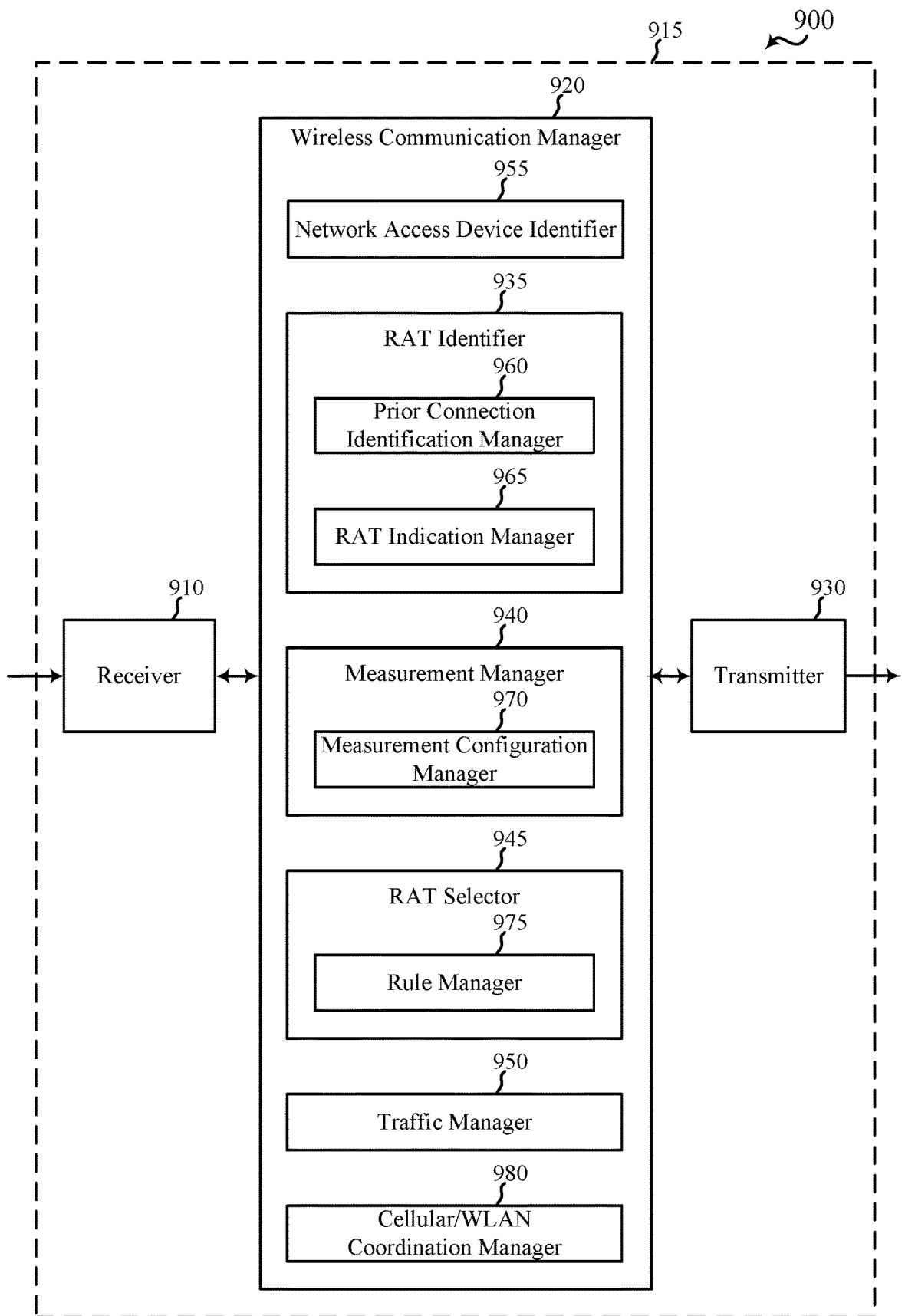
FIG. 9 shows a block diagram of an apparatus for use in wireless communication, in accordance with various aspects of the present disclosure.

FIG. 9 shows a block diagram 900 of an apparatus 915 for use in wireless communication, in accordance with various aspects of the present disclosure. The apparatus 915 may be an example of aspects of one or more of the UEs described with reference to FIG. 1, 2, or 3. The apparatus 915 may also be or include a processor. The apparatus 915 may include a receiver 910, a wireless communication manager 920, or a transmitter 930. Each of these components may be in communication with each other.

The components of the apparatus 915 may, individually or collectively, be implemented using one or more ASICs adapted to perform some or all of the applicable functions in hardware. Alternatively, the functions may be performed by one or more other processing units (or cores), on one or more integrated circuits. In other examples, other types of integrated circuits may be used (e.g., Structured/Platform ASICs, FPGAs, a SoC, and/or other types of Semi-Custom ICs), which may be programmed in any manner known in the art. The functions of each component may also be implemented, in whole or in part, with instructions embodied in a memory, formatted to be executed by one or more general or application-specific processors.

In some examples, the receiver 910 may include at least one RF receiver, such as at least one RF receiver operable to receive transmissions over a licensed radio frequency spectrum band (e.g., a radio frequency spectrum band licensed to particular users for particular uses) or an unlicensed radio frequency spectrum band (e.g., a radio frequency spectrum band available for Wi-Fi use, a radio frequency spectrum band available for use by different radio access technologies, or a radio frequency spectrum band available for use by multiple MNOs in an equally shared or prioritized manner). In some examples, the licensed radio frequency spectrum band or the unlicensed radio frequency spectrum band may be used for LTE/LTE-A communications, as described, for example, with reference to FIG. 1, 2, 3, 4, 5, 6, or 7. The receiver 910 may be used to receive various types of data or control signals (i.e., "data" or transmissions) over one or more communication links of a wireless communication system, such as one or more communication links of the wireless communication system 100 or 200 described with reference to FIG. 1 or 2. The communication links may be established over the licensed radio frequency spectrum band or the unlicensed radio frequency spectrum band.

In some examples, the transmitter 930 may include at least one RF transmitter, such as at least one RF transmitter operable to transmit over the licensed radio frequency spectrum band or the unlicensed radio frequency spectrum band. The transmitter 930 may be used to transmit various types of data or control signals (i.e., "data" or transmissions) over one or more communication links of a wireless communication system, such as one or more communication links of the wireless communication system 100 or 200 described with reference to FIG. 1 or 2. The communication links may be established over the licensed radio frequency spectrum band or the unlicensed radio frequency spectrum band.

In some examples, the wireless communication manager 920 may be used to manage one or more aspects of wireless communication for the apparatus 915. In some examples, part of the wireless communication manager 920 may be incorporated into or shared with the receiver 910 or the transmitter 930. In some examples, the wireless communication manager 920 may include a network access device identifier 955, a RAT identifier 935, a measurement manager 940, a RAT selector 945, a traffic manager 950, or a cellular/WLAN coordination manager 980. In some examples, the RAT identifier 935 may include a prior connection identification manager 960 or an available RAT indication manager 965. In some examples, the measurement manager 940 may include a measurement configuration manager 970. In some examples, the RAT selector 945 may include a rule manager 975.

The network access device identifier 955 may be used to identify a network access device within range of the apparatus 915.

The RAT identifier 935 may be used to determine whether both a cellular RAT and a WLAN RAT are available over an unlicensed radio frequency spectrum band.

The measurement manager 940 may be used to obtain measurements (e.g., perform measurements or receive measurements) for at least the cellular RAT or the WLAN RAT. In some examples, obtaining the measurements may include determining at least one of a RSRP, a RSRQ, or a combination thereof.

The RAT selector 945 may be used to selecting one of the cellular RAT or the WLAN RAT for a class of traffic. The selected RAT may be selected based at least in part on the measurements.

The traffic manager 950 may be used to serve the class of traffic based at least in part on the selected RAT. In some examples, the class of traffic may include a gateway connection associated with an APN, and serving the class of traffic may include at least one of initiating the gateway connection, offloading the gateway connection, or performing a handover of the gateway connection. In some examples, the class of traffic may include all of the traffic routed to a default route by the operating system, such as Internet traffic. In some examples, the traffic manager 950 may also or alternatively determine that no class of traffic is using a RAT (e.g., a WLAN RAT) and prevent or terminate an association with the RAT.

In some examples, the prior connection identification manager 960 may be used to save at least one of identifiers of network access devices that configure the apparatus 915 to communicate over an unlicensed radio frequency spectrum band based at least in part on a cellular RAT, or physical cell identities associated with the network access devices that configure the apparatus 915 to communicate over the unlicensed radio frequency spectrum band based at least in part on the cellular RAT. When the network access device identifier 955 identifies a network access device within range of the apparatus 915, the RAT identifier 935 may determine whether the cellular RAT over the unlicensed radio frequency spectrum band is available by determining whether an identifier of the network access device or a PCI associated with the network access device is saved.

In some examples, the measurement configuration manager 970 may be used to receive, from a network access device, a measurement configuration for a predetermined radio frequency spectrum band. In some examples, the predetermined radio frequency spectrum band may include a 5 GHz radio frequency spectrum band. In some examples, the predetermined radio frequency spectrum band may include an unlicensed radio frequency spectrum band. In some examples, the RAT identifier 935 may determine whether the cellular RAT over the unlicensed radio frequency spectrum band is available based at least in part on receiving the measurement configuration for the predetermined radio frequency spectrum band from the network access device.

In some examples, the available RAT indication manager 965 may be used to receive, in a BCCH, an indication that a network access device supports a use of the cellular RAT over the unlicensed radio frequency spectrum band, and the RAT identifier 935 may determine that the cellular RAT over the unlicensed radio frequency spectrum band is available based at least in part on the RAT indication manager 965 receiving the indication that the network access device supports a use of the cellular RAT over the unlicensed radio frequency spectrum band.

In some examples, the RAT identifier 935 may be used to receive, from a network access device, an indication of at least one carrier frequency of at least one usable carrier of the cellular RAT over the unlicensed radio frequency spectrum band. In these examples, the measurement manager 940 may obtain measurements for the at least one usable carrier.

In some examples, the rule manager 975 may be used to receive system information including RAN rules. The RAN rules may include at least one threshold for selecting a cellular RAT or a WLAN RAT over an unlicensed radio frequency spectrum band based on the measurements. In some examples, the at least one threshold may be included in a cellular RAT over a licensed radio frequency spectrum band to WLAN RAT offload configuration IE of the system information, or in a cellular RAT over a licensed radio frequency spectrum band to cellular RAT over an unlicensed radio frequency spectrum band offload configuration IE of the system information. In some examples, the RAT identifier 935 may determine that the cellular RAT is available over the unlicensed radio frequency spectrum band based at least in part on receiving the at least one threshold. In some examples, the RAT selector 945 may select the cellular RAT or the WLAN RAT based at least in part on a comparison of the measurements to the at least one threshold received in the RAN rules.

In some examples, the rule manager 975 may be used to receive an ANDSF management object including ANDSF rules. The ANDSF rules may include at least one threshold for selecting a cellular RAT or a WLAN RAT over an unlicensed radio frequency spectrum band based on the measurements. In some examples, the RAT selector 945 may select the cellular RAT or the WLAN RAT based at least in part on a comparison of the measurements to the at least one threshold received in the ANDSF rules.

In some examples, the RAT selector 945 may be used to determine whether the WLAN RAT is associated with a WLAN having a lower priority than a cellular network associated with the cellular RAT. In some examples, an indication that the WLAN is associated with the lower priority than the cellular network may be received from a network access device. In some examples, the WLAN may have the lower priority than the cellular network for a class of traffic. In some examples, the RAT selector 945 may select the cellular RAT over the WLAN RAT based at least in part on the determined availability of the cellular RAT and the determined lower priority of the WLAN.

In some examples, the cellular/WLAN coordination manager 980 may be used to select a WLAN channel in the unlicensed radio frequency spectrum band. The WLAN channel may be selected for operating a WLAN service (e.g., an access point or a Peer to Peer Group Owner (PGO)). The WLAN channel may also be selected based at least in part on a bandwidth used for the cellular RAT over the unlicensed radio frequency spectrum band.

Figure 10:
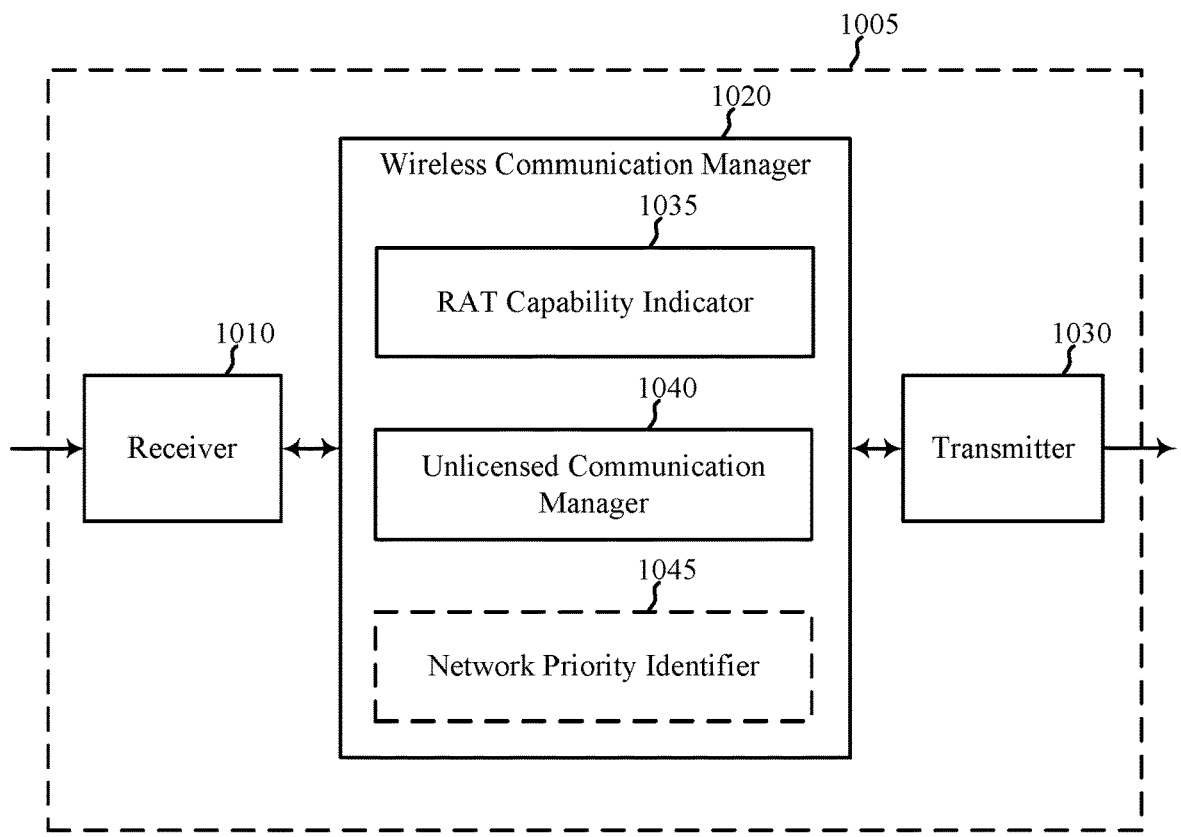
FIG. 10 shows a block diagram of an apparatus for use in wireless communication, in accordance with various aspects of the present disclosure.

FIG. 10 shows a block diagram 1000 of an apparatus 1005 for use in wireless communication, in accordance with various aspects of the present disclosure. The apparatus 1005 may be an example of aspects of one or more of the network access devices described with reference to FIG. 1, 2, or 3. The apparatus 1005 may also be or include a processor. The apparatus 1005 may include a receiver 1010, a wireless communication manager 1020, or a transmitter 1030. Each of these components may be in communication with each other.

The components of the apparatus 1005 may, individually or collectively, be implemented using one or more ASICs adapted to perform some or all of the applicable functions in hardware. Alternatively, the functions may be performed by one or more other processing units (or cores), on one or more integrated circuits. In other examples, other types of integrated circuits may be used (e.g., Structured/Platform ASICs, FPGAs, a SoC, and/or other types of Semi-Custom ICs), which may be programmed in any manner known in the art. The functions of each component may also be implemented, in whole or in part, with instructions embodied in a memory, formatted to be executed by one or more general or application-specific processors.

In some examples, the receiver 1010 may include at least one RF receiver, such as at least one RF receiver operable to receive transmissions over a licensed radio frequency spectrum band (e.g., a radio frequency spectrum band licensed to particular users for particular uses) or an unlicensed radio frequency spectrum band (e.g., a radio frequency spectrum band available for Wi-Fi use, a radio frequency spectrum band available for use by different radio access technologies, or a radio frequency spectrum band available for use by multiple MNOs in an equally shared or prioritized manner). In some examples, the licensed radio frequency spectrum band or the unlicensed radio frequency spectrum band may be used for LTE/LTE-A communications, as described, for example, with reference to FIG. 1, 2, 3, 4, 5, 6, or 7. The receiver 1010 may be used to receive various types of data or control signals (i.e., "data" or transmissions) over one or more communication links of a wireless communication system, such as one or more communication links of the wireless communication system 100 or 200 described with reference to FIG. 1 or 2. The communication links may be established over the licensed radio frequency spectrum band or the unlicensed radio frequency spectrum band.

In some examples, the transmitter 1030 may include at least one RF transmitter, such as at least one RF transmitter operable to transmit over the licensed radio frequency spectrum band or the unlicensed radio frequency spectrum band. The transmitter 1030 may be used to transmit various types of data or control signals (i.e., "data" or transmissions) over one or more communication links of a wireless communication system, such as one or more communication links of the wireless communication system 100 or 200 described with reference to FIG. 1 or 2. The communication links may be established over the licensed radio frequency spectrum band or the unlicensed radio frequency spectrum band.

In some examples, the wireless communication manager 1020 may be used to manage one or more aspects of wireless communication for the apparatus 1005. In some examples, part of the wireless communication manager 1020 may be incorporated into or shared with the receiver 1010 or the transmitter 1030. In some examples, the wireless communication manager 1020 may include a RAT capability indicator 1035, an unlicensed communication manager 1040, or a network priority identifier 1045.

The RAT capability indicator 1035 may be used to indicate that the network access device supports a cellular RAT over an unlicensed radio frequency spectrum band. In some examples, indicating that the network access device supports the cellular RAT over the unlicensed radio frequency spectrum band may include transmitting a measurement configuration for a predetermined radio frequency spectrum band. In some examples, the predetermined radio frequency spectrum band may include a 5 GHz radio frequency spectrum band. In some examples, the predetermined radio frequency spectrum band may include the unlicensed radio frequency spectrum band. In some examples, indicating that the network access device supports the cellular RAT over the unlicensed radio frequency spectrum band may include transmitting, in a BCCH, an indication that the network access device supports the cellular RAT over the unlicensed radio frequency spectrum band.

The RAT capability indicator 1035 may also be used to transmit an indication of at least one carrier frequency of at least one usable carrier of the cellular RAT over the unlicensed radio frequency spectrum band.

The unlicensed communication manager 1040 may be used to communicate with at least one UE based at least in part on the cellular RAT over the unlicensed radio frequency spectrum band.

The network priority identifier 1045 may be used to indicate that a WLAN has a lower priority than a cellular network associated with the cellular RAT. In some examples, the indication may include an identifier of the WLAN. In some examples, the WLAN may be a WLAN operated by a same operator that operates the cellular network. In some examples, the indication that the WLAN has the lower priority than the cellular network may indicate that the WLAN has the lower priority than the cellular network for a class of traffic (which may indicate, or imply, that the WLAN has a priority that is equal to or higher than the priority of the cellular network for other classes of traffic).

Figure 11:
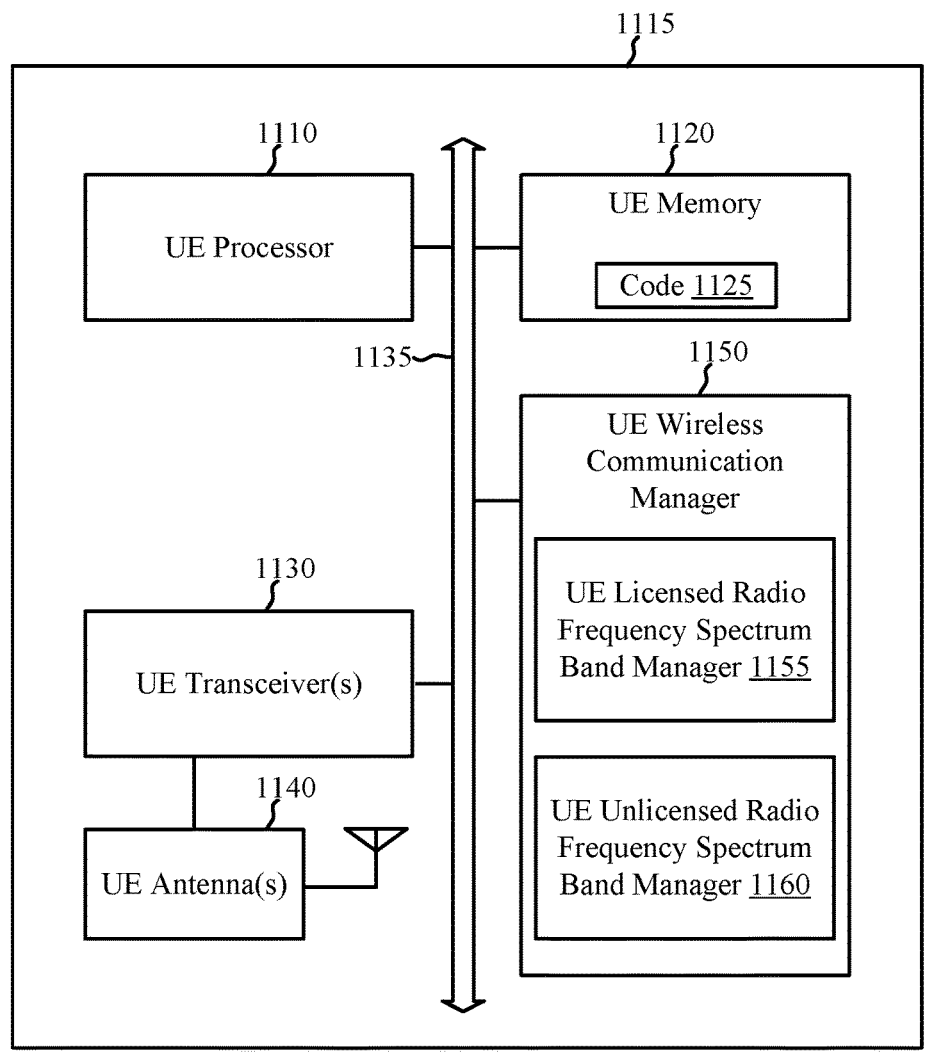
FIG. 11 shows a block diagram of a UE for use in wireless communication, in accordance with various aspects of the present disclosure.

FIG. 11 shows a block diagram 1100 of a UE 1115 for use in wireless communication, in accordance with various aspects of the present disclosure. The UE 1115 may be included or be part of a personal computer (e.g., a laptop computer, a netbook computer, a tablet computer, etc.), a cellular telephone, a PDA, a DVR, an internet appliance, a gaming console, an e-reader, etc. The UE 1115 may, in some examples, have an internal power supply (not shown), such as a small battery, to facilitate mobile operation. In some examples, the UE 1115 may be an example of aspects of one or more of the UEs described with reference to FIG. 1, 2, or 3, or aspects of the apparatus described with reference to FIG. 8 or 9. The UE 1115 may be configured to implement at least some of the UE or apparatus techniques and functions described with reference to FIG. 1, 2, 3, 4, 5, 6, 7, 8, or 9.

The UE 1115 may include a UE processor 1110, a UE memory 1120, at least one UE transceiver (represented by UE transceiver(s) 1130), at least one UE antenna (represented by UE antenna(s) 1140), or a UE wireless communication manager 1150. Each of these components may be in communication with each other, directly or indirectly, over one or more buses 1135.

The UE memory 1120 may include random access memory (RAM) or read-only memory (ROM). The UE memory 1120 may store computer-readable, computer-executable code 1125 containing instructions that are configured to, when executed, cause the UE processor 1110 to perform various functions described herein related to wireless communication, including, for example, selecting a RAT over an unlicensed radio frequency spectrum band for serving a class of traffic, etc. Alternatively, the computer-executable code 1125 may not be directly executable by the UE processor 1110 but be configured to cause the UE 1115 (e.g., when compiled and executed) to perform various of the functions described herein.

The UE processor 1110 may include an intelligent hardware device, e.g., a central processing unit (CPU), a microcontroller, an ASIC, etc. The UE processor 1110 may process information received through the UE transceiver(s) 1130 or information to be sent to the UE transceiver(s) 1130 for transmission through the UE antenna(s) 1140. The UE processor 1110 may handle, alone or in connection with the UE wireless communication manager 1150, various aspects of communicating over (or managing communications over) a licensed radio frequency spectrum band or the unlicensed radio frequency spectrum band.

The UE transceiver(s) 1130 may include a modem configured to modulate packets and provide the modulated packets to the UE antenna(s) 1140 for transmission, and to demodulate packets received from the UE antenna(s) 1140. The UE transceiver(s) 1130 may, in some examples, be implemented as one or more UE transmitters and one or more separate UE receivers. The UE transceiver(s) 1130 may support communications in the licensed radio frequency spectrum band or the unlicensed radio frequency spectrum band. The UE transceiver(s) 1130 may be configured to communicate bi-directionally, via the UE antenna(s) 1140, with one or more network access devices (e.g., base stations or radio heads) or apparatuses, such as one or more of the network access devices (e.g., base stations) described with reference to FIG. 1, 2, or 3, or one or more of the apparatuses described with reference to FIG. 8 or 9. While the UE 1115 may include a single UE antenna, there may be examples in which the UE 1115 may include multiple UE antennas 1140.

The UE wireless communication manager 1150 may be configured to perform or control some or all of the UE or apparatus techniques or functions described with reference to FIG. 1, 2, 3, 4, 5, 6, 7, 8, or 9 related to wireless communication over the licensed radio frequency spectrum band or the unlicensed radio frequency spectrum band. For example, the UE wireless communication manager 1150 may be configured to support a supplemental downlink mode (e.g., a LAA mode), a carrier aggregation mode (e.g., an eLAA mode), or a standalone mode (e.g., a MF mode) using the licensed radio frequency spectrum band or the unlicensed radio frequency spectrum band. The UE wireless communication manager 1150 may include a UE licensed radio frequency spectrum band manager 1155 configured to handle communications in the licensed radio frequency spectrum band, and a UE unlicensed radio frequency spectrum band manager 1160 configured to handle communications in the unlicensed radio frequency spectrum band. The UE wireless communication manager 1150, or portions of it, may include a processor, or some or all of the functions of the UE wireless communication manager 1150 may be performed by the UE processor 1110 or in connection with the UE processor 1110. In some examples, the UE wireless communication manager 1150 may be an example of the wireless communication manager described with reference to FIG. 8 or 9.

Figure 12:
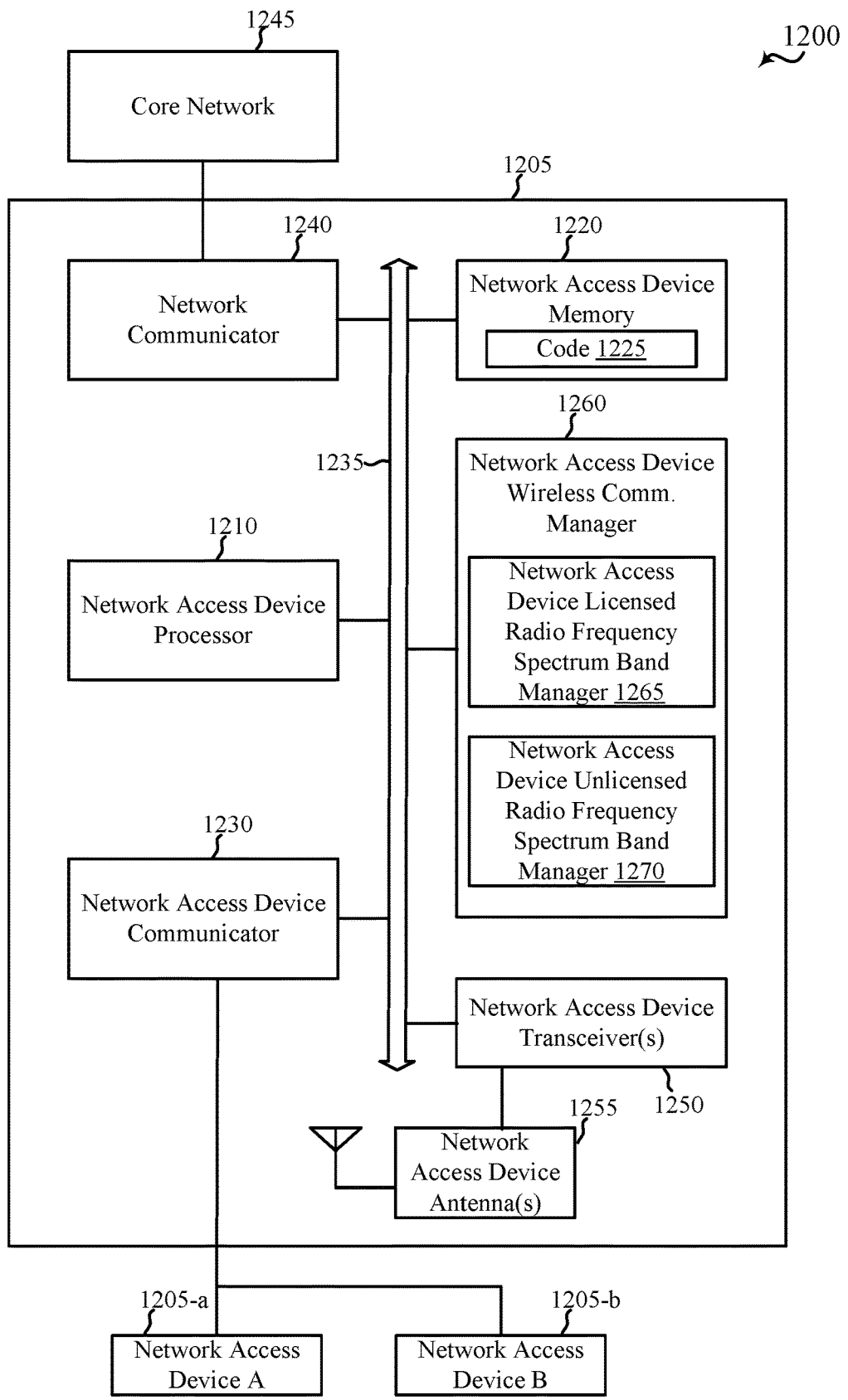
FIG. 12 shows a block diagram of a network access device (e.g., a base station) for use in wireless communication, in accordance with various aspects of the present disclosure.

FIG. 12 shows a block diagram 1200 of a network access device 1205 (e.g., a base station) for use in wireless communication, in accordance with various aspects of the present disclosure. In some examples, the network access device 1205 may be an example of one or more aspects of the network access devices (e.g., base stations) described with reference to FIG. 1, 2, or 3, or aspects of the apparatus described with reference to FIG. 10. The network access device 1205 may be configured to implement or facilitate at least some of the network access device, base station, or apparatus techniques and functions described with reference to FIG. 1, 2, 3, 4, 5, 6, 7, or 10.

The network access device 1205 may include a network access device processor 1210, a network access device memory 1220, at least one network access device transceiver (represented by network access device transceiver(s) 1250), at least one network access device antenna (represented by network access device antenna(s) 1255), or a network access device wireless communication manager 1260. The network access device 1205 may also include one or more of a network access device communicator 1230 or a network communicator 1240. Each of these components may be in communication with each other, directly or indirectly, over one or more buses 1235.

The network access device memory 1220 may include RAM or ROM. The network access device memory 1220 may store computer-readable, computer-executable code 1225 containing instructions that are configured to, when executed, cause the network access device processor 1210 to perform various functions described herein related to wireless communication, including, for example, indicating the network access device 1205 supports a cellular RAT over an unlicensed radio frequency spectrum band, etc.. Alternatively, the computer-executable code 1225 may not be directly executable by the network access device processor 1210 but be configured to cause the network access device 1205 (e.g., when compiled and executed) to perform various of the functions described herein.

The network access device processor 1210 may include an intelligent hardware device, e.g., a CPU, a microcontroller, an ASIC, etc. The network access device processor 1210 may process information received through the network access device transceiver(s) 1250, the network access device communicator 1230, or the network communicator 1240. The network access device processor 1210 may also process information to be sent to the transceiver(s) 1250 for transmission through the antenna(s) 1255, to the network access device communicator 1230, for transmission to one or more other network access devices (e.g., network access device 1205-a and/or network access device 1205-b), or to the network communicator 1240 for transmission to a core network 1245, which may be an example of one or more aspects of the core network 130 described with reference to FIG. 1. The network access device processor 1210 may handle, alone or in connection with the network access device wireless communication manager 1260, various aspects of communicating over (or managing communications over) a licensed radio frequency spectrum band or the unlicensed radio frequency spectrum band.

The network access device transceiver(s) 1250 may include a modem configured to modulate packets and provide the modulated packets to the network access device antenna(s) 1255 for transmission, and to demodulate packets received from the network access device antenna(s) 1255. The network access device transceiver(s) 1250 may, in some examples, be implemented as one or more network access device transmitters and one or more separate network access device receivers. The network access device transceiver(s) 1250 may support communications in the licensed radio frequency spectrum band or the unlicensed radio frequency spectrum band. The network access device transceiver(s) 1250 may be configured to communicate bi-directionally, via the network access device antenna(s) 1255, with one or more UEs or apparatuses, such as one or more of the UEs described with reference to FIG. 1, 2, 3, or 11, or the apparatus described with reference to FIG. 10. The network access device 1205 may, for example, include multiple network access device antennas 1255 (e.g., an antenna array). The network access device 1205 may communicate with the core network 1245 through the network communicator 1240. The network access device 1205 may also communicate with other network access devices, such as the network access device 1205-a and/or the network access device 1205-b, using the network access device communicator 1230.

The network access device wireless communication manager 1260 may be configured to perform or control some or all of the techniques or functions described with reference to FIG. 1, 2, 3, 4, 5, 6, 7, or 10 related to wireless communication over the licensed radio frequency spectrum band or the unlicensed radio frequency spectrum band. For example, the network access device wireless communication manager 1260 may be configured to support a supplemental downlink mode (e.g., a LAA mode), a carrier aggregation mode (e.g., an eLAA mode), or a standalone mode (e.g., a MF mode) using the licensed radio frequency spectrum band or the unlicensed radio frequency spectrum band. The network access device wireless communication manager 1260 may include a network access device licensed radio frequency spectrum band manager 1265 configured to handle communications in the licensed radio frequency spectrum band, and a network access device unlicensed radio frequency spectrum band manager 1270 configured to handle communications in the unlicensed radio frequency spectrum band. The network access device wireless communication manager 1260, or portions of it, may include a processor, or some or all of the functions of the network access device wireless communication manager 1260 may be performed by the network access device processor 1210 or in connection with the network access device processor 1210. In some examples, the network access device wireless communication manager 1260 may be an example of the wireless communication manager described with reference to FIG. 10.

Figure 13:
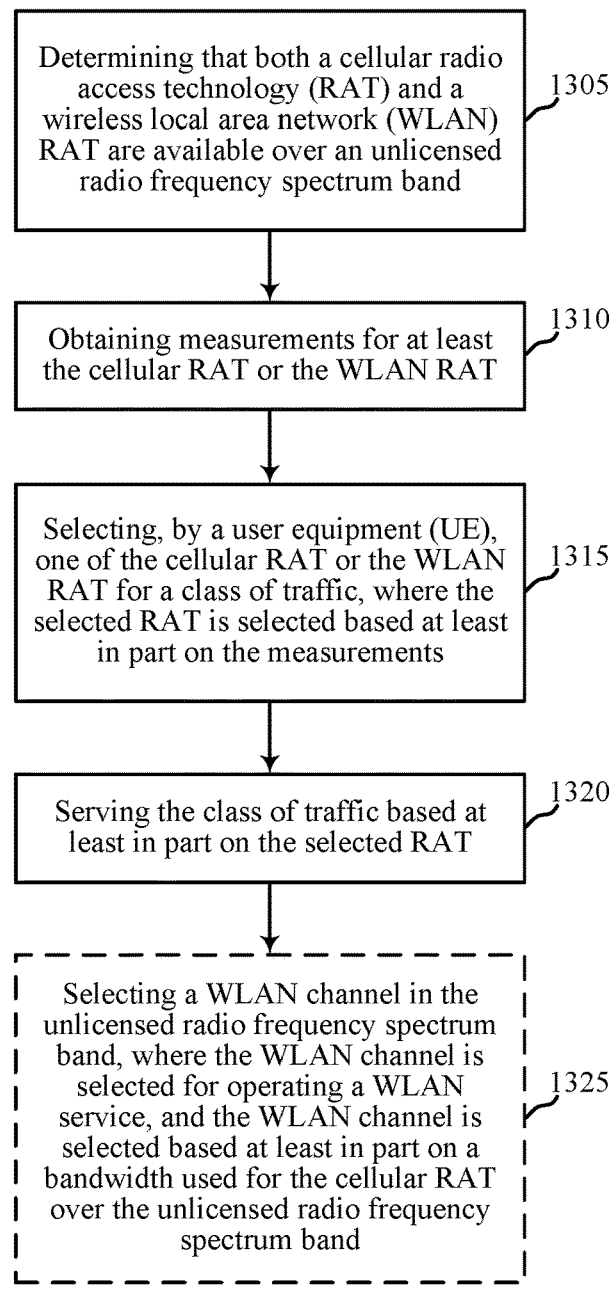
FIG. 13 is a flow chart illustrating an example of a method for wireless communication at a UE, in accordance with various aspects of the present disclosure.

FIG. 13 is a flow chart illustrating an example of a method 1300 for wireless communication at a UE, in accordance with various aspects of the present disclosure. For clarity, the method 1300 is described below with reference to aspects of one or more of the UEs described with reference to FIG. 1, 2, 3, or 11, or aspects of the apparatus described with reference to FIG. 8 or 9. In some examples, a UE may execute one or more sets of codes to control the functional elements of the UE to perform the functions described below. Additionally or alternatively, the UE may perform one or more of the functions described below using special-purpose hardware.

At block 1305, the method 1300 may include determining that both a cellular RAT and a WLAN RAT are available over an unlicensed radio frequency spectrum band. The operation(s) at block 1305 may be performed using the wireless communication manager 820 or 920 described with reference to FIG. 8 or 9, the UE wireless communication manager 1150 described with reference to FIG. 11, or the RAT identifier 835 or 935 described with reference to FIG. 8 or 9.

At block 1310, the method 1300 may include obtaining measurements (e.g., performing measurements or receiving measurements) for at least the cellular RAT or the WLAN RAT. In some examples, obtaining the measurements may include determining at least one of a RSRP, a RSRQ, or a combination thereof. The operation(s) at block 1310 may be performed using the wireless communication manager 820 or 920 described with reference to FIG. 8 or 9, the UE wireless communication manager 1150 described with reference to FIG. 11, or the measurement manager 840 or 940 described with reference to FIG. 8 or 9.

At block 1315, the method 1300 may include selecting, by the UE, one of the cellular RAT or the WLAN RAT for a class of traffic. The selected RAT may be selected based at least in part on the measurements. The operation(s) at block 1315 may be performed using the wireless communication manager 820 or 920 described with reference to FIG. 8 or 9, the UE wireless communication manager 1150 described with reference to FIG. 11, or the RAT selector 845 or 945 described with reference to FIG. 8 or 9.

At block 1320, the method 1300 may include serving the class of traffic based at least in part on the selected RAT. In some examples, the class of traffic may include a gateway connection associated with an APN, and serving the class of traffic may include at least one of initiating the gateway connection, offloading the gateway connection, or performing a handover of the gateway connection. The operation(s) at block 1320 may be performed using the wireless communication manager 820 or 920 described with reference to FIG. 8 or 9, the UE wireless communication manager 1150 described with reference to FIG. 11, or the traffic manager 850 or 950 described with reference to FIG. 8 or 9.

At block 1325, the method 1300 may optionally include selecting a WLAN channel in the unlicensed radio frequency spectrum band. The WLAN channel may be selected for operating a WLAN service (e.g., an access point or a PGO). The WLAN channel may also be selected based at least in part on a bandwidth used for the cellular RAT over the unlicensed radio frequency spectrum band.

Figure 14:
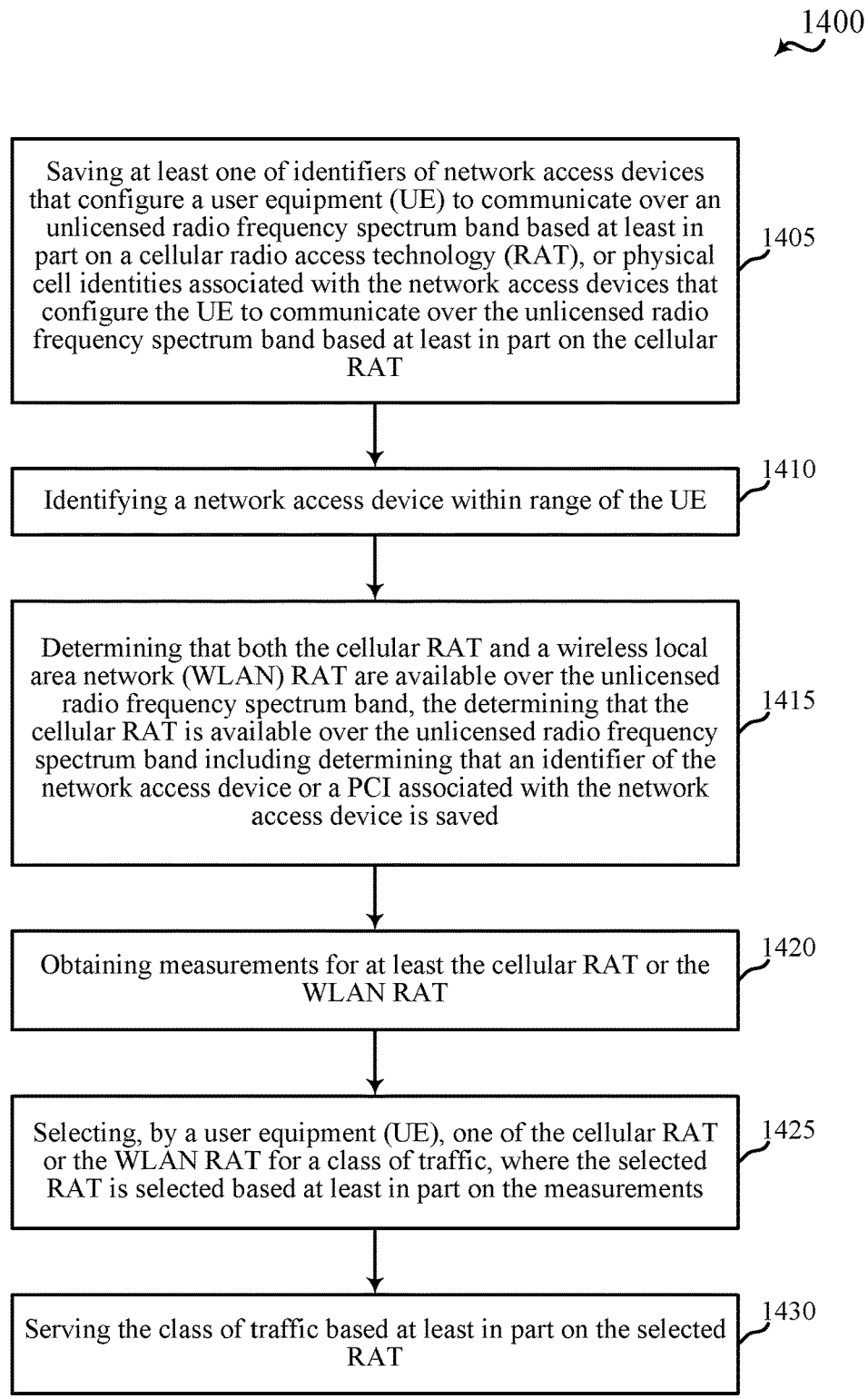
FIG. 14 is a flow chart illustrating an example of a method for wireless communication at a UE, in accordance with various aspects of the present disclosure.

FIG. 14 is a flow chart illustrating an example of a method 1400 for wireless communication at a UE, in accordance with various aspects of the present disclosure. For clarity, the method 1400 is described below with reference to aspects of one or more of the UEs described with reference to FIG. 1, 2, 3, or 11, or aspects of the apparatus described with reference to FIG. 8 or 9. In some examples, a UE may execute one or more sets of codes to control the functional elements of the UE to perform the functions described below. Additionally or alternatively, the UE may perform one or more of the functions described below using special-purpose hardware.

At block 1405, the method 1400 may include saving at least one of identifiers of network access devices that configure the UE to communicate over an unlicensed radio frequency spectrum band based at least in part on a cellular RAT, or physical cell identities associated with the network access devices that configure the UE to communicate over the unlicensed radio frequency spectrum band based at least in part on the cellular RAT. The operation(s) at block 1405 may be performed using the wireless communication manager 820 or 920 described with reference to FIG. 8 or 9, the UE wireless communication manager 1150 described with reference to FIG. 11, the RAT identifier 835 or 935 described with reference to FIG. 8 or 9, or the prior connection identification manager 960 described with reference to FIG. 9.

At block 1410, the method 1400 may include identifying a network access device within range of the UE. The operation(s) at block 1410 may be performed using the wireless communication manager 820 or 920 described with reference to FIG. 8 or 9, the UE wireless communication manager 1150 described with reference to FIG. 11, or the network access device identifier 955 described with reference to FIG. 9.

At block 1415, the method 1400 may include determining that both the cellular RAT and a WLAN RAT are available over the unlicensed radio frequency spectrum band. Determining that the cellular RAT is available over the unlicensed radio frequency spectrum band may include determining that an identifier of the network access device or a PCI associated with the network access device is saved. The operation(s) at block 1415 may be performed using the wireless communication manager 820 or 920 described with reference to FIG. 8 or 9, the UE wireless communication manager 1150 described with reference to FIG. 11, or the RAT identifier 835 or 935 described with reference to FIG. 8 or 9.

At block 1420, the method 1400 may include obtaining measurements (e.g., performing measurements or receiving measurements) for at least the cellular RAT or the WLAN RAT. In some examples, obtaining the measurements may include determining at least one of a RSRP, a RSRQ, or a combination thereof. The operation(s) at block 1420 may be performed using the wireless communication manager 820 or 920 described with reference to FIG. 8 or 9, the UE wireless communication manager 1150 described with reference to FIG. 11, or the measurement manager 840 or 940 described with reference to FIG. 8 or 9.

At block 1425, the method 1400 may include selecting, by the UE, one of the cellular RAT or the WLAN RAT for a class of traffic. The selected RAT may be selected based at least in part on the measurements. The operation(s) at block 1425 may be performed using the wireless communication manager 820 or 920 described with reference to FIG. 8 or 9, the UE wireless communication manager 1150 described with reference to FIG. 11, or the RAT selector 845 or 945 described with reference to FIG. 8 or 9.

At block 1430, the method 1400 may include serving the class of traffic based at least in part on the selected RAT. In some examples, the class of traffic may include a gateway connection associated with an APN, and serving the class of traffic may include at least one of initiating the gateway connection, offloading the gateway connection, or performing a handover of the gateway connection. The operation(s) at block 1430 may be performed using the wireless communication manager 820 or 920 described with reference to FIG. 8 or 9, the UE wireless communication manager 1150 described with reference to FIG. 11, or the traffic manager 850 or 950 described with reference to FIG. 8 or 9.

Figure 15:
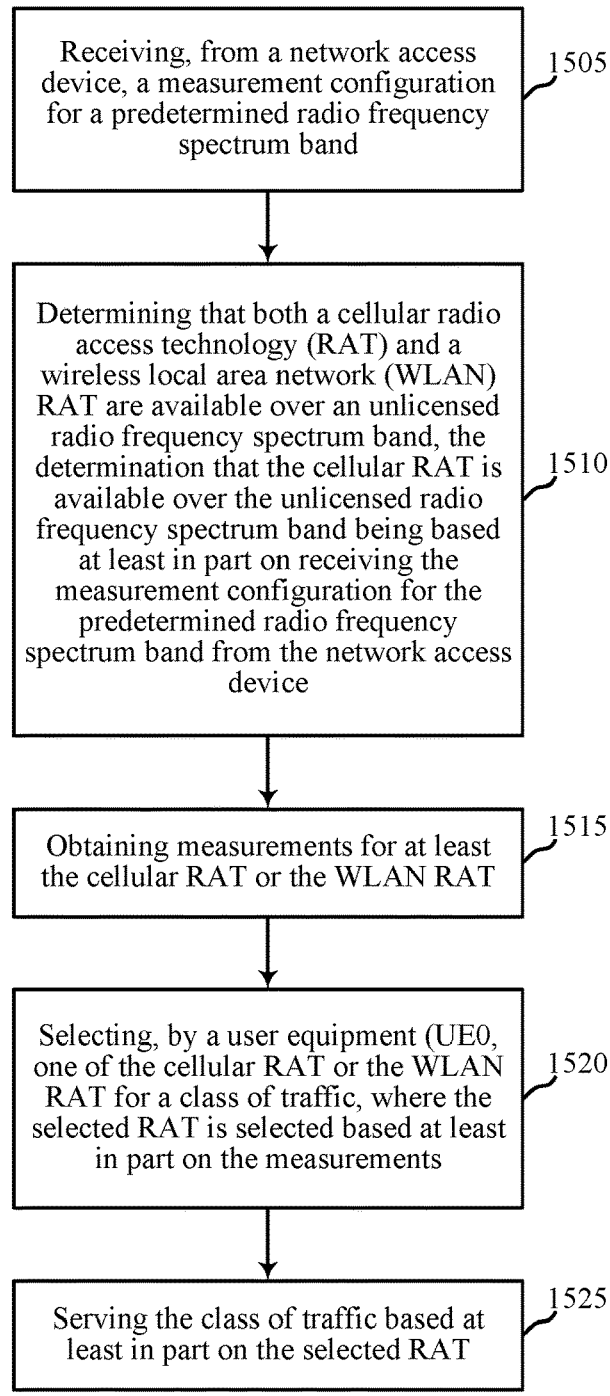
FIG. 15 is a flow chart illustrating an example of a method for wireless communication at a UE, in accordance with various aspects of the present disclosure.

FIG. 15 is a flow chart illustrating an example of a method 1500 for wireless communication at a UE, in accordance with various aspects of the present disclosure. For clarity, the method 1500 is described below with reference to aspects of one or more of the UEs described with reference to FIG. 1, 2, 3, or 11, or aspects of the apparatus described with reference to FIG. 8 or 9. In some examples, a UE may execute one or more sets of codes to control the functional elements of the UE to perform the functions described below. Additionally or alternatively, the UE may perform one or more of the functions described below using special-purpose hardware.

At block 1505, the method 1500 may include receiving, from a network access device, a measurement configuration for a predetermined radio frequency spectrum band. In some examples, the predetermined radio frequency spectrum band may include a 5 GHz radio frequency spectrum band. In some examples, the predetermined radio frequency spectrum band may include an unlicensed radio frequency spectrum band. The operation(s) at block 1505 may be performed using the wireless communication manager 820 or 920 described with reference to FIG. 8 or 9, the UE wireless communication manager 1150 described with reference to FIG. 11, the measurement manager 840 or 940 described with reference to FIG. 8 or 9, or the measurement configuration manager 970 described with reference to FIG. 9.

At block 1510, the method 1500 may include determining that both a cellular RAT and a WLAN RAT are available over the unlicensed radio frequency spectrum band. In some examples, the determination that the cellular RAT is available over the unlicensed radio frequency spectrum band may be based at least in part on receiving the measurement configuration for the predetermined radio frequency spectrum band from the network access device. The operation(s) at block 1510 may be performed using the wireless communication manager 820 or 920 described with reference to FIG. 8 or 9, the UE wireless communication manager 1150 described with reference to FIG. 11, or the RAT identifier 835 or 935 described with reference to FIG. 8 or 9.

At block 1515, the method 1500 may include obtaining measurements (e.g., performing measurements or receiving measurements) for at least the cellular RAT or the WLAN RAT. In some examples, obtaining the measurements may include determining at least one of a RSRP, a RSRQ, or a combination thereof. The operation(s) at block 1615 may be performed using the wireless communication manager 820 or 920 described with reference to FIG. 8 or 9, the UE wireless communication manager 1150 described with reference to FIG. 11, or the measurement manager 840 or 940 described with reference to FIG. 8 or 9.

At block 1520, the method 1500 may include selecting, by the UE, one of the cellular RAT or the WLAN RAT for a class of traffic. The selected RAT may be selected based at least in part on the measurements. The operation(s) at block 1520 may be performed using the wireless communication manager 820 or 920 described with reference to FIG. 8 or 9, the UE wireless communication manager 1150 described with reference to FIG. 11, or the RAT selector 845 or 945 described with reference to FIG. 8 or 9.

At block 1525, the method 1500 may include serving the class of traffic based at least in part on the selected RAT. In some examples, the class of traffic may include a gateway connection associated with an APN, and serving the class of traffic may include at least one of initiating the gateway connection, offloading the gateway connection, or performing a handover of the gateway connection. The operation(s) at block 1525 may be performed using the wireless communication manager 820 or 920 described with reference to FIG. 8 or 9, the UE wireless communication manager 1150 described with reference to FIG. 11, or the traffic manager 850 or 950 described with reference to FIG. 8 or 9.

Figure 16:
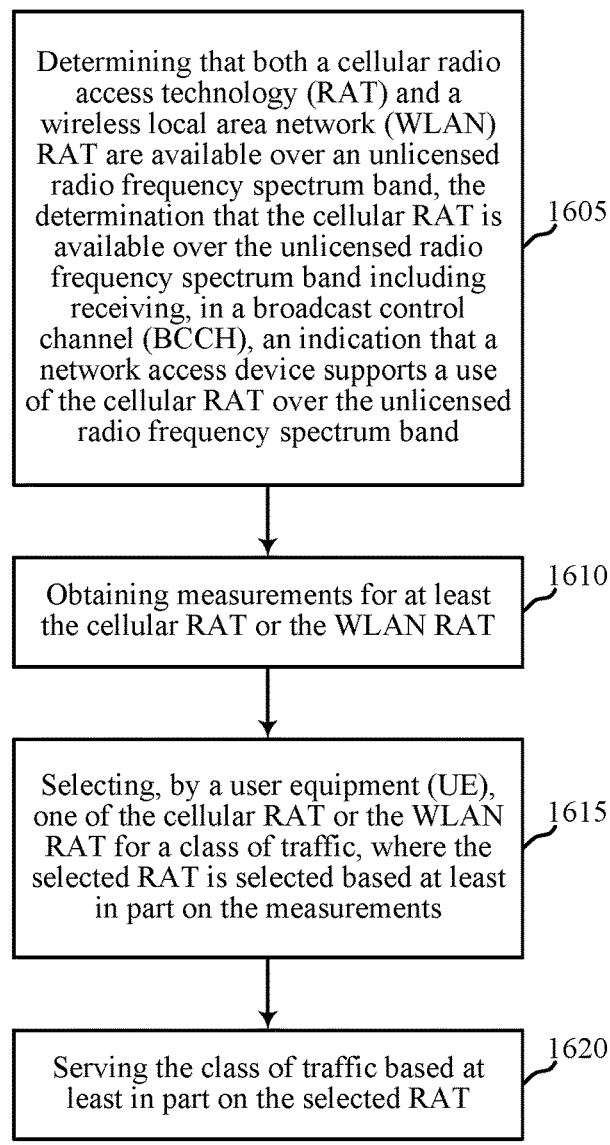
FIG. 16 is a flow chart illustrating an example of a method for wireless communication at a UE, in accordance with various aspects of the present disclosure.

FIG. 16 is a flow chart illustrating an example of a method 1600 for wireless communication at a UE, in accordance with various aspects of the present disclosure. For clarity, the method 1600 is described below with reference to aspects of one or more of the UEs described with reference to FIG. 1, 2, 3, or 11, or aspects of the apparatus described with reference to FIG. 8 or 9. In some examples, a UE may execute one or more sets of codes to control the functional elements of the UE to perform the functions described below. Additionally or alternatively, the UE may perform one or more of the functions described below using special-purpose hardware.

At block 1605, the method 1600 may include determining that both a cellular RAT and a WLAN RAT are available over an unlicensed radio frequency spectrum band. In some examples, determining that the cellular RAT is available over the unlicensed radio frequency spectrum band may include receiving, in a BCCH, an indication that a network access device supports a use of the cellular RAT over the unlicensed radio frequency spectrum band. The operation(s) at block 1605 may be performed using the wireless communication manager 820 or 920 described with reference to FIG. 8 or 9, the UE wireless communication manager 1150 described with reference to FIG. 11, the RAT identifier 835 or 935 described with reference to FIG. 8 or 9, or the available RAT indication manager 965 described with reference to FIG. 9.

At block 1610, the method 1600 may include obtaining measurements (e.g., performing measurements or receiving measurements) for at least the cellular RAT or the WLAN RAT. In some examples, obtaining the measurements may include determining at least one of a RSRP, a RSRQ, or a combination thereof. The operation(s) at block 1610 may be performed using the wireless communication manager 820 or 920 described with reference to FIG. 8 or 9, the UE wireless communication manager 1150 described with reference to FIG. 11, or the measurement manager 840 or 940 described with reference to FIG. 8 or 9.

At block 1615, the method 1600 may include selecting, by the UE, one of the cellular RAT or the WLAN RAT for a class of traffic. The selected RAT may be selected based at least in part on the measurements. The operation(s) at block 1615 may be performed using the wireless communication manager 820 or 920 described with reference to FIG. 8 or 9, the UE wireless communication manager 1150 described with reference to FIG. 11, or the RAT selector 845 or 945 described with reference to FIG. 8 or 9.

At block 1620, the method 1600 may include serving the class of traffic based at least in part on the selected RAT. In some examples, the class of traffic may include a gateway connection associated with an APN, and serving the class of traffic may include at least one of initiating the gateway connection, offloading the gateway connection, or performing a handover of the gateway connection. The operation(s) at block 1620 may be performed using the wireless communication manager 820 or 920 described with reference to FIG. 8 or 9, the UE wireless communication manager 1150 described with reference to FIG. 11, or the traffic manager 850 or 950 described with reference to FIG. 8 or 9.

Figure 17:
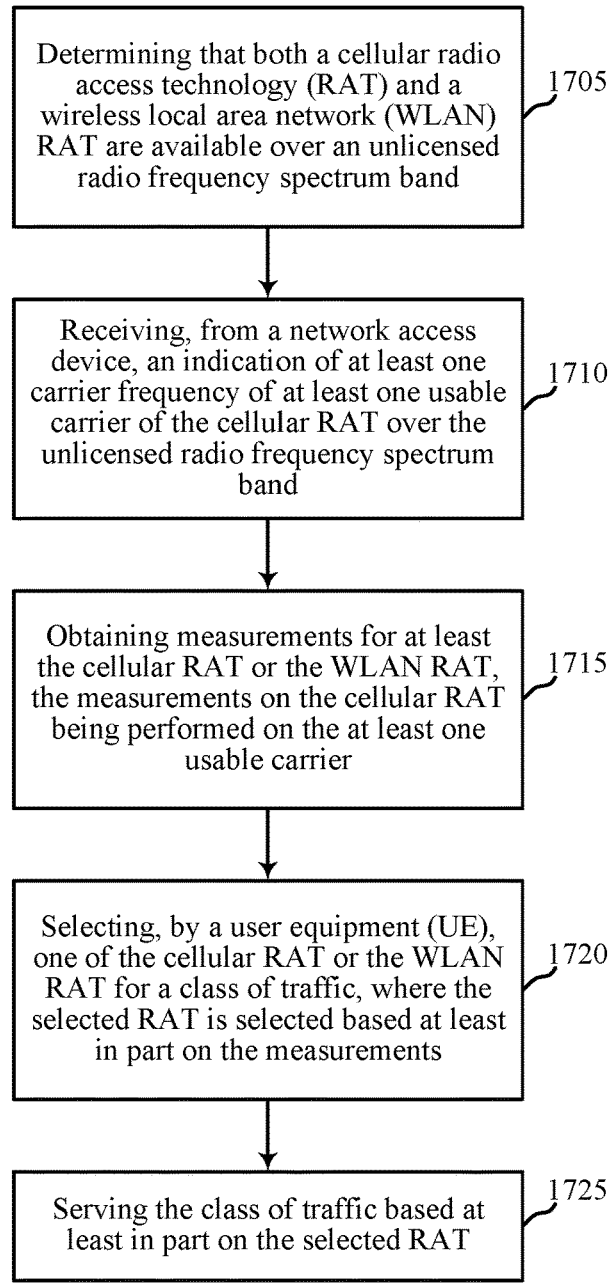
FIG. 17 is a flow chart illustrating an example of a method for wireless communication at a UE, in accordance with various aspects of the present disclosure.

FIG. 17 is a flow chart illustrating an example of a method 1700 for wireless communication at a UE, in accordance with various aspects of the present disclosure. For clarity, the method 1700 is described below with reference to aspects of one or more of the UEs described with reference to FIG. 1, 2, 3, or 11, or aspects of the apparatus described with reference to FIG. 8 or 9. In some examples, a UE may execute one or more sets of codes to control the functional elements of the UE to perform the functions described below. Additionally or alternatively, the UE may perform one or more of the functions described below using special-purpose hardware.

At block 1705, the method 1700 may include determining that both a cellular RAT and a WLAN RAT are available over an unlicensed radio frequency spectrum band. The operation(s) at block 1705 may be performed using the wireless communication manager 820 or 920 described with reference to FIG. 8 or 9, the UE wireless communication manager 1150 described with reference to FIG. 11, or the RAT identifier 835 or 935 described with reference to FIG. 8 or 9.

At block 1710, the method 1700 may include receiving, from a network access device, an indication of at least one carrier frequency of at least one usable carrier of the cellular RAT over the unlicensed radio frequency spectrum band. The operation(s) at block 1710 may be performed using the wireless communication manager 820 or 920 described with reference to FIG. 8 or 9, the UE wireless communication manager 1150 described with reference to FIG. 11, or the RAT identifier 835 or 935 described with reference to FIG. 8 or 9.

At block 1715, the method 1700 may include obtaining measurements (e.g., performing measurements or receiving measurements) for at least the cellular RAT or the WLAN RAT. In some examples, obtaining the measurements may include determining at least one of a RSRP, a RSRQ, or a combination thereof. In some examples, the measurements on the cellular RAT may be obtained for the at least one usable carrier. The operation(s) at block 1715 may be performed using the wireless communication manager 820 or 920 described with reference to FIG. 8 or 9, the UE wireless communication manager 1150 described with reference to FIG. 11, or the measurement manager 840 or 940 described with reference to FIG. 8 or 9.

At block 1720, the method 1700 may include selecting, by the UE, one of the cellular RAT or the WLAN RAT for a class of traffic. The selected RAT may be selected based at least in part on the measurements. The operation(s) at block 1720 may be performed using the wireless communication manager 820 or 920 described with reference to FIG. 8 or 9, the UE wireless communication manager 1150 described with reference to FIG. 11, or the RAT selector 845 or 945 described with reference to FIG. 8 or 9.

At block 1725, the method 1700 may include serving the class of traffic based at least in part on the selected RAT. In some examples, the class of traffic may include a gateway connection associated with an APN, and serving the class of traffic may include at least one of initiating the gateway connection, offloading the gateway connection, or performing a handover of the gateway connection. The operation(s) at block 1725 may be performed using the wireless communication manager 820 or 920 described with reference to FIG. 8 or 9, the UE wireless communication manager 1150 described with reference to FIG. 11, or the traffic manager 850 or 950 described with reference to FIG. 8 or 9.

Figure 18:
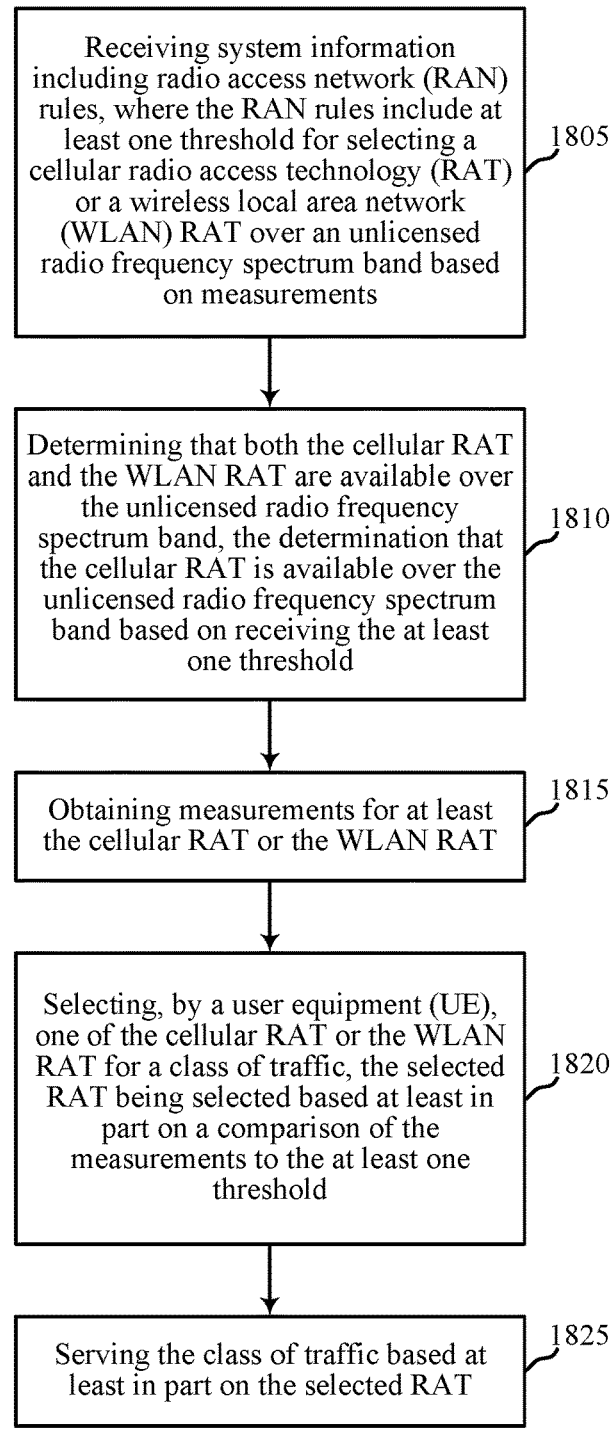
FIG. 18 is a flow chart illustrating an example of a method for wireless communication at a UE, in accordance with various aspects of the present disclosure.

FIG. 18 is a flow chart illustrating an example of a method 1800 for wireless communication at a UE, in accordance with various aspects of the present disclosure. For clarity, the method 1800 is described below with reference to aspects of one or more of the UEs described with reference to FIG. 1, 2, 3, or 11, or aspects of the apparatus described with reference to FIG. 8 or 9. In some examples, a UE may execute one or more sets of codes to control the functional elements of the UE to perform the functions described below. Additionally or alternatively, the UE may perform one or more of the functions described below using special-purpose hardware.

At block 1805, the method 1800 may include receiving system information including RAN rules. The RAN rules may include at least one threshold for selecting a cellular RAT or a WLAN RAT over an unlicensed radio frequency spectrum band based on measurements. In some examples, the at least one threshold may be included in a cellular RAT over a licensed radio frequency spectrum band to WLAN RAT offload configuration IE of the system information, or in a cellular RAT over a licensed radio frequency spectrum band to cellular RAT over an unlicensed radio frequency spectrum band offload configuration IE of the system information. The operation(s) at block 1805 may be performed using the wireless communication manager 820 or 920 described with reference to FIG. 8 or 9, the UE wireless communication manager 1150 described with reference to FIG. 11, the RAT selector 845 or 945 described with reference to FIG. 8 or 9, or the rule manager 975 described with reference to FIG. 9.

At block 1810, the method 1800 may include determining that both the cellular RAT and the WLAN RAT are available over the unlicensed radio frequency spectrum band. The determination that the cellular RAT is available over the unlicensed radio frequency spectrum band may be based at least in part on receiving the at least one threshold. The operation(s) at block 1810 may be performed using the wireless communication manager 820 or 920 described with reference to FIG. 8 or 9, the UE wireless communication manager 1150 described with reference to FIG. 11, or the RAT identifier 835 or 935 described with reference to FIG. 8 or 9.

At block 1815, the method 1800 may include obtaining measurements (e.g., performing measurements or receiving measurements) for at least the cellular RAT or the WLAN RAT. In some examples, obtaining the measurements may include determining at least one of a RSRP, a RSRQ, or a combination thereof. The operation(s) at block 1815 may be performed using the wireless communication manager 820 or 920 described with reference to FIG. 8 or 9, the UE wireless communication manager 1150 described with reference to FIG. 11, or the measurement manager 840 or 940 described with reference to FIG. 8 or 9.

At block 1820, the method 1800 may include selecting, by the UE, one of the cellular RAT or the WLAN RAT for a class of traffic. The selected RAT may be selected based at least in part on the measurements (e.g., based at least in part on a comparison of the measurements to the at least one threshold). The operation(s) at block 1820 may be performed using the wireless communication manager 820 or 920 described with reference to FIG. 8 or 9, the UE wireless communication manager 1150 described with reference to FIG. 11, or the RAT selector 845 or 945 described with reference to FIG. 8 or 9.

At block 1825, the method 1800 may include serving the class of traffic based at least in part on the selected RAT. In some examples, the class of traffic may include a gateway connection associated with an APN, and serving the class of traffic may include at least one of initiating the gateway connection, offloading the gateway connection, or performing a handover of the gateway connection. The operation(s) at block 1825 may be performed using the wireless communication manager 820 or 920 described with reference to FIG. 8 or 9, the UE wireless communication manager 1150 described with reference to FIG. 11, or the traffic manager 850 or 950 described with reference to FIG. 8 or 9.

Figure 19:
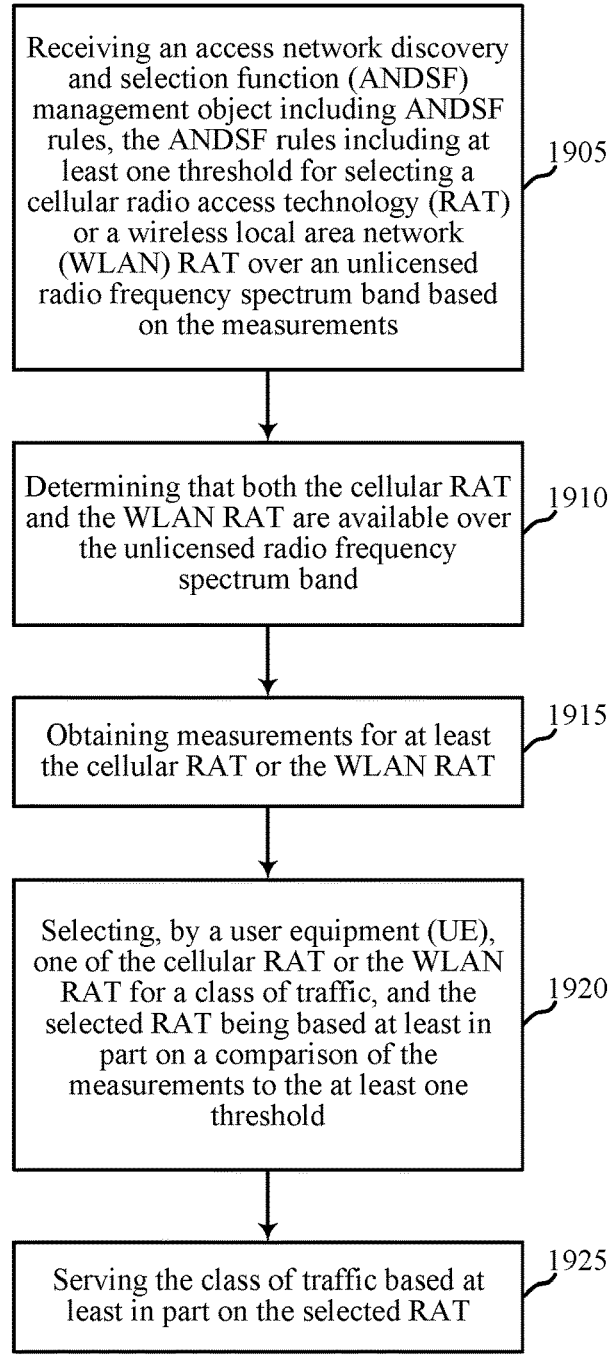
FIG. 19 is a flow chart illustrating an example of a method for wireless communication at a UE, in accordance with various aspects of the present disclosure.

FIG. 19 is a flow chart illustrating an example of a method 1900 for wireless communication at a UE, in accordance with various aspects of the present disclosure. For clarity, the method 1900 is described below with reference to aspects of one or more of the UEs described with reference to FIG. 1, 2, 3, or 11, or aspects of the apparatus described with reference to FIG. 8 or 9. In some examples, a UE may execute one or more sets of codes to control the functional elements of the UE to perform the functions described below. Additionally or alternatively, the UE may perform one or more of the functions described below using special-purpose hardware.

At block 1905, the method 1900 may include receiving an ANDSF management object including ANDSF rules. The ANDSF rules may include at least one threshold for selecting a cellular RAT or a WLAN RAT over an unlicensed radio frequency spectrum band based on the measurements. The operation(s) at block 1905 may be performed using the wireless communication manager 820 or 920 described with reference to FIG. 8 or 9, the UE wireless communication manager 1150 described with reference to FIG. 11, the RAT identifier 835 or 935 described with reference to FIG. 8 or 9, or the rule manager 975 described with reference to FIG. 9.

At block 1910, the method 1900 may include determining that both the cellular RAT and the WLAN RAT are available over the unlicensed radio frequency spectrum band. The operation(s) at block 1910 may be performed using the wireless communication manager 820 or 920 described with reference to FIG. 8 or 9, the UE wireless communication manager 1150 described with reference to FIG. 11, or the RAT identifier 835 or 935 described with reference to FIG. 8 or 9.

At block 1915, the method 1900 may include obtaining measurements (e.g., performing measurements or receiving measurements) for at least the cellular RAT or the WLAN RAT. In some examples, obtaining the measurements may include determining at least one of a RSRP, a RSRQ, or a combination thereof. The operation(s) at block 1915 may be performed using the wireless communication manager 820 or 920 described with reference to FIG. 8 or 9, the UE wireless communication manager 1150 described with reference to FIG. 11, or the measurement manager 840 or 940 described with reference to FIG. 8 or 9.

At block 1920, the method 1900 may include selecting, by the UE, one of the cellular RAT or the WLAN RAT for a class of traffic. The selected RAT may be selected based at least in part on the measurements. In some examples, the selection of the cellular RAT or the WLAN RAT may be based at least in part on a comparison of the measurements to the at least one threshold. The operation(s) at block 1920 may be performed using the wireless communication manager 820 or 920 described with reference to FIG. 8 or 9, the UE wireless communication manager 1150 described with reference to FIG. 11, or the RAT selector 845 or 945 described with reference to FIG. 8 or 9.

At block 1925, the method 1900 may include serving the class of traffic based at least in part on the selected RAT. In some examples, the class of traffic may include a gateway connection associated with an APN, and serving the class of traffic may include at least one of initiating the gateway connection, offloading the gateway connection, or performing a handover of the gateway connection. The operation(s) at block 1925 may be performed using the wireless communication manager 820 or 920 described with reference to FIG. 8 or 9, the UE wireless communication manager 1150 described with reference to FIG. 11, or the traffic manager 850 or 950 described with reference to FIG. 8 or 9.

Figure 20:
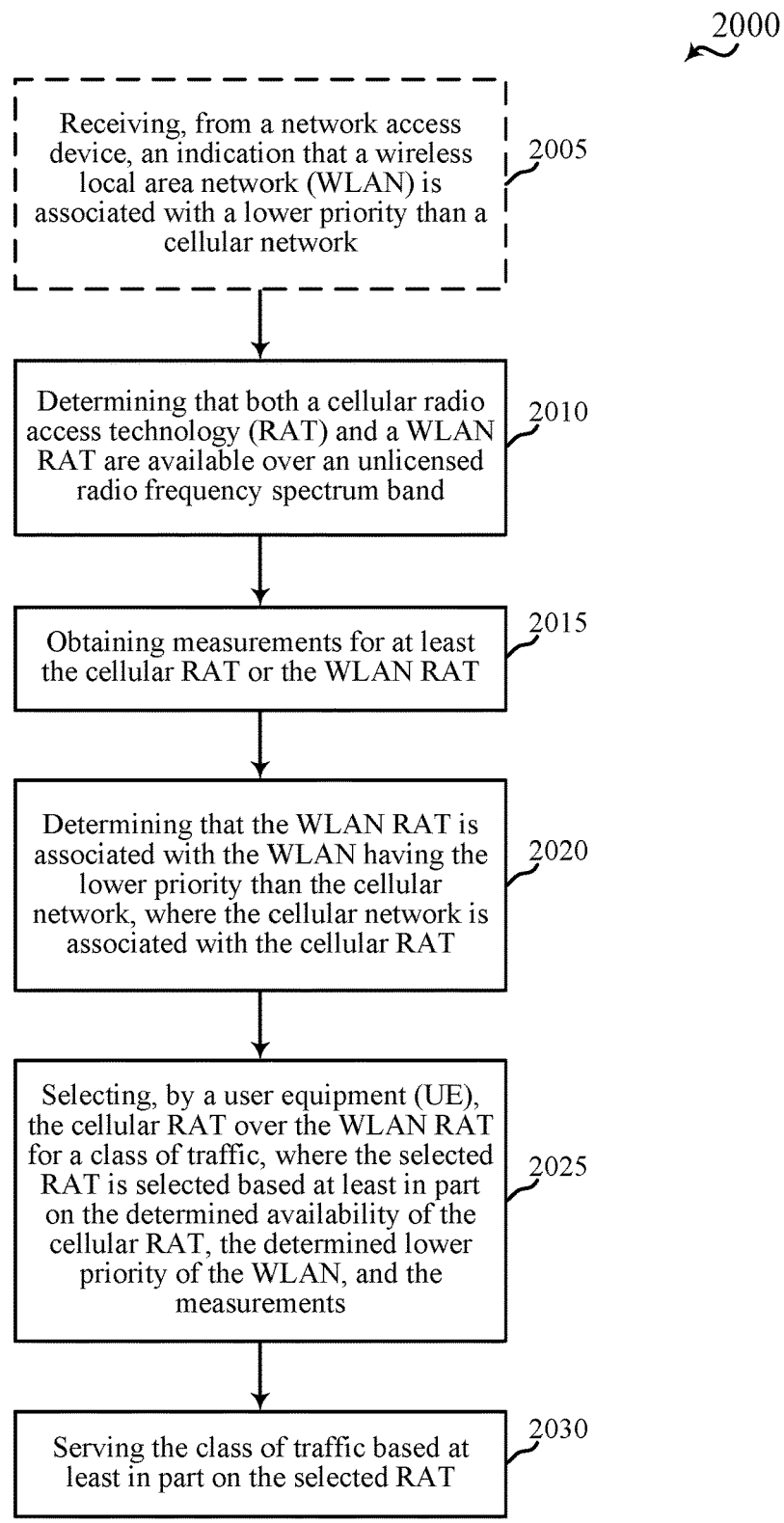
FIG. 20 is a flow chart illustrating an example of a method for wireless communication at a UE, in accordance with various aspects of the present disclosure.

FIG. 20 is a flow chart illustrating an example of a method 2000 for wireless communication at a UE, in accordance with various aspects of the present disclosure. For clarity, the method 2000 is described below with reference to aspects of one or more of the UEs described with reference to FIG. 1, 2, 3, or 11, or aspects of the apparatus described with reference to FIG. 8 or 9. In some examples, a UE may execute one or more sets of codes to control the functional elements of the UE to perform the functions described below. Additionally or alternatively, the UE may perform one or more of the functions described below using special-purpose hardware.

At block 2005, the method 2000 may include receiving, from a network access device, an indication that a WLAN is associated with a lower priority than a cellular network. In some examples, the WLAN may have the lower priority than the cellular network for a class of traffic. The operation(s) at block 2005 may be performed using the wireless communication manager 820 or 920 described with reference to FIG. 8 or 9, the UE wireless communication manager 1150 described with reference to FIG. 11, or the RAT selector 845 or 945 described with reference to FIG. 8 or 9.

At block 2010, the method 2000 may include determining that both a cellular RAT and a WLAN RAT are available over an unlicensed radio frequency spectrum band. The operation(s) at block 2010 may be performed using the wireless communication manager 820 or 920 described with reference to FIG. 8 or 9, the UE wireless communication manager 1150 described with reference to FIG. 11, or the RAT identifier 835 or 935 described with reference to FIG. 8 or 9.

At block 2015, the method 2000 may include obtaining measurements (e.g., performing measurements or receiving measurements) for at least the cellular RAT or the WLAN RAT. In some examples, obtaining the measurements may include determining at least one of a RSRP, a RSRQ, or a combination thereof. The operation(s) at block 2015 may be performed using the wireless communication manager 820 or 920 described with reference to FIG. 8 or 9, the UE wireless communication manager 1150 described with reference to FIG. 11, or the measurement manager 840 or 940 described with reference to FIG. 8 or 9.

At block 2020, the method 2000 may include determining that the WLAN RAT is associated with the WLAN having the lower priority than the cellular network, where the cellular network is associated with the cellular RAT. The operation(s) at block 2020 may be performed using the wireless communication manager 820 or 920 described with reference to FIG. 8 or 9, the UE wireless communication manager 1150 described with reference to FIG. 11, or the RAT selector 845 or 945 described with reference to FIG. 8 or 9.

At block 2025, the method 2000 may include selecting, by the UE, the cellular RAT over the WLAN RAT for a class of traffic. The selected RAT may be selected based at least in part on the determined availability of the cellular RAT, the determined lower priority of the WLAN, and the measurements. The operation(s) at block 2025 may be performed using the wireless communication manager 820 or 920 described with reference to FIG. 8 or 9, the UE wireless communication manager 1150 described with reference to FIG. 11, or the RAT selector 845 or 945 described with reference to FIG. 8 or 9.

At block 2030, the method 2000 may include serving the class of traffic based at least in part on the selected RAT. In some examples, the class of traffic may include a gateway connection associated with an APN, and serving the class of traffic may include at least one of initiating the gateway connection, offloading the gateway connection, or performing a handover of the gateway connection. In some examples, the class of traffic may include all of the traffic routed to a default route by the operating system, such as Internet traffic. The operation(s) at block 2030 may be performed using the wireless communication manager 820 or 920 described with reference to FIG. 8 or 9, the UE wireless communication manager 1150 described with reference to FIG. 11, or the traffic manager 850 or 950 described with reference to FIG. 8 or 9.

In some examples, the operation(s) at block 2030 may also or alternatively include determining that no class of traffic is using a RAT (e.g., a WLAN RAT), and preventing or terminating an association with the RAT.

Figure 21:
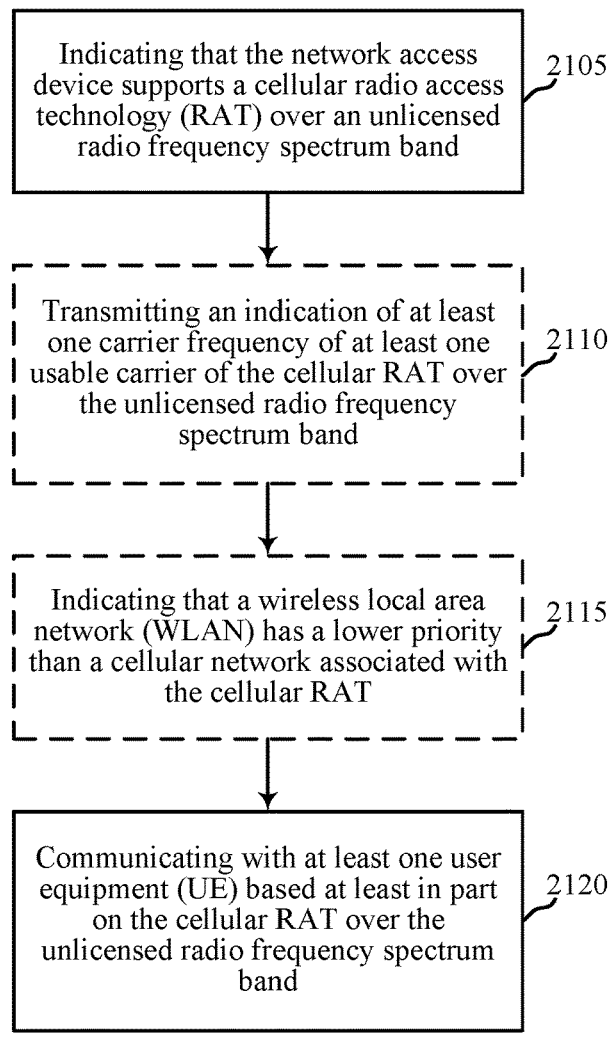
FIG. 21 is a flow chart illustrating an example of a method for wireless communication at a network access device, in accordance with various aspects of the present disclosure.

FIG. 21 is a flow chart illustrating an example of a method 2100 for wireless communication at a network access device, in accordance with various aspects of the present disclosure. For clarity, the method 2100 is described below with reference to aspects of one or more of the network access devices (e.g., base stations) described with reference to FIG. 1, 2, 3, or 12, or aspects of the apparatus described with reference to FIG. 10. In some examples, a network access device may execute one or more sets of codes to control the functional elements of the network access device to perform the functions described below. Additionally or alternatively, the network access device may perform one or more of the functions described below using special-purpose hardware.

At block 2105, the method 2100 may include indicating that the network access device supports a cellular RAT over an unlicensed radio frequency spectrum band. In some examples, indicating that the network access device supports the cellular RAT over the unlicensed radio frequency spectrum band may include transmitting a measurement configuration for a predetermined radio frequency spectrum band. In some examples, the predetermined radio frequency spectrum band may include a 5 GHz radio frequency spectrum band. In some examples, the predetermined radio frequency spectrum band may include the unlicensed radio frequency spectrum band. In some examples, indicating that the network access device supports the cellular RAT over the unlicensed radio frequency spectrum band may include transmitting, in a BCCH, an indication that the network access device supports the cellular RAT over the unlicensed radio frequency spectrum band. The operation(s) at block 2105 may be performed using the wireless communication manager 1020 described with reference to FIG. 10, the network access device wireless communication manager 1260 described with reference to FIG. 12, or the RAT capability indicator 1035 described with reference to FIG. 10.

At block 2110, the method 2100 may optionally include transmitting an indication of at least one carrier frequency of at least one usable carrier of the cellular RAT over the unlicensed radio frequency spectrum band. The operation(s) at block 2110 may be performed using the wireless communication manager 1020 described with reference to FIG. 10, the network access device wireless communication manager 1260 described with reference to FIG. 12, or the RAT capability indicator 1035 described with reference to FIG. 10.

At block 2115, the method 2100 may include indicating that a WLAN has a lower priority than a cellular network associated with the cellular RAT. In some examples, the indication may include an identifier of the WLAN. In some examples, the WLAN may be a WLAN operated by a same operator that operates the cellular network. In some examples, the indication that the WLAN has the lower priority than the cellular network may indicate that the WLAN has the lower priority than the cellular network for a class of traffic (which may indicate, or imply, that the WLAN has a priority that is equal to or higher than the priority of the cellular network for other classes of traffic). The operation(s) at block 2115 may be performed using the wireless communication manager 1020 described with reference to FIG. 10, the network access device wireless communication manager 1260 described with reference to FIG. 12, or the network priority identifier 1045 described with reference to FIG. 10.

At block 2120, the method 2100 may include communicating with at least one UE based at least in part on the cellular RAT over the unlicensed radio frequency spectrum band. The operation(s) at block 2120 may be performed using the wireless communication manager 1020 described with reference to FIG. 10, the network access device wireless communication manager 1260 described with reference to FIG. 12, or the unlicensed communication manager 1040 described with reference to FIG. 10.

The methods 1300, 1400, 1500, 1600, 1700, 1800, 1900, 2000, and 2100 described with reference to FIGS. 13, 14, 15, 16, 17, 18, 19, 20, and 21 are examples of implementations of techniques described in the present disclosure, and the operations of the methods 1300, 1400, 1500, 1600, 1700, 1800, 1900, 2000, and 2100 may be rearranged, combined with other operations of the same or different methods, or otherwise modified, such that other implementations are possible. Operations may also be added to the methods 1300, 1400, 1500, 1600, 1700, 1800, 1900, 2000, and 2100. In some examples, aspects of the methods 1300, 1400, 1500, 1600, 1700, 1800, 1900, or 2000 may be combined.

Techniques described herein may be used for various wireless communication systems such as CDMA, TDMA, FDMA, OFDMA, SC-FDMA, and other systems. The terms "system" and "network" are often used interchangeably. A CDMA system may implement a radio technology such as CDMA2000, Universal Terrestrial Radio Access (UTRA), etc. CDMA2000 covers IS-2000, IS-95, and IS-856 standards. IS-2000 Releases 0 and A may be referred to as CDMA2000 1x, 1x, etc. IS-856 (TIA-856) may be referred to as CDMA2000 1xEV-DO, High Rate Packet Data (HRPD), etc. UTRA includes Wideband CDMA (WCDMA) and other variants of CDMA. A TDMA system may implement a radio technology such as Global System for Mobile Communications (GSM). An OFDMA system may implement a radio technology such as Ultra Mobile Broadband (UMB), Evolved UTRA (E-UTRA), IEEE 802.11 (Wi-Fi), IEEE 802.16 (WiMAX), IEEE 802.20, Flash-OFDM™, etc. UTRA and E-UTRA are part of Universal Mobile Telecommunication System (UMTS). 3GPP LTE and LTE-A are new releases of UMTS that use E-UTRA. UTRA, E-UTRA, UMTS, LTE, LTE-A, and GSM are described in documents from an organization named 3GPP. CDMA2000 and UMB are described in documents from an organization named "3rd Generation Partnership Project 2" (3GPP2). The techniques described herein may be used for the systems and radio technologies mentioned above as well as other systems and radio technologies, including cellular (e.g., LTE) communications over an unlicensed radio frequency spectrum band. The description above, however, describes an LTE/LTE-A system for purposes of example, and LTE terminology is used in much of the description above, although the techniques are applicable beyond LTE/LTE-A applications.

The detailed description set forth above in connection with the appended drawings describes examples and does not represent all of the examples that may be implemented or that are within the scope of the claims. The terms "example" and "exemplary," when used in this description, mean "serving as an example, instance, or illustration," and not "preferred" or "advantageous over other examples." The detailed description includes specific details for the purpose of providing an understanding of the described techniques. These techniques, however, may be practiced without these specific details. In some instances, well-known structures and apparatuses are shown in block diagram form in order to avoid obscuring the concepts of the described examples.

Information and signals may be represented using any of a variety of different technologies and techniques. For example, data, instructions, commands, information, signals, bits, symbols, and chips that may be referenced throughout the above description may be represented by voltages, currents, electromagnetic waves, magnetic fields or particles, optical fields or particles, or any combination thereof.

The various illustrative blocks and components described in connection with the disclosure herein may be implemented or performed with a general-purpose processor, a digital signal processor (DSP), an ASIC, an FPGA or other programmable logic device, discrete gate or transistor logic, discrete hardware components, or any combination thereof designed to perform the functions described herein. A general-purpose processor may be a microprocessor, but in the alternative, the processor may be any conventional processor, controller, microcontroller, or state machine. A processor may also be implemented as a combination of computing devices, e.g., a combination of a DSP and a microprocessor, multiple microprocessors, one or more microprocessors in conjunction with a DSP core, or any other such configuration.

The functions described herein may be implemented in hardware, software executed by a processor, firmware, or any combination thereof If implemented in software executed by a processor, the functions may be stored on or transmitted over as one or more instructions or code on a computer-readable medium. Other examples and implementations are within the scope and spirit of the disclosure and appended claims. For example, due to the nature of software, functions described above can be implemented using software executed by a processor, hardware, firmware, hardwiring, or combinations of any of these. Components implementing functions may also be physically located at various positions, including being distributed such that portions of functions are implemented at different physical locations. As used herein, including in the claims, the term "or," when used in a list of two or more items, means that any one of the listed items can be employed by itself, or any combination of two or more of the listed items can be employed. For example, if a composition is described as containing components A, B, or C, the composition can contain A alone; B alone; C alone; A and B in combination; A and C in combination; B and C in combination; or A, B, and C in combination. Also, as used herein, including in the claims, "or" as used in a list of items (for example, a list of items prefaced by a phrase such as "at least one of" or "one or more of") indicates a disjunctive list such that, for example, a list of "at least one of A, B, or C" means A or B or C or AB or AC or BC or ABC (i.e., A and B and C).

Computer-readable media includes both non-transitory computer storage media and communication media including any medium that facilitates transfer of a computer program from one place to another. A non-transitory storage medium may be any available medium that can be accessed by a general purpose or special purpose computer. By way of example, and not limitation, non-transitory computer-readable media can include RAM, ROM, electrically erasable programmable read only memory (EEPROM), compact disk (CD) ROM or other optical disk storage, magnetic disk storage or other magnetic storage devices, or any other non-transitory medium that can be used to carry or store desired program code means in the form of instructions or data structures and that can be accessed by a general-purpose or special-purpose computer, or a general-purpose or special-purpose processor. Also, any connection is properly termed a computer-readable medium. For example, if the software is transmitted from a website, server, or other remote source using a coaxial cable, fiber optic cable, twisted pair, digital subscriber line (DSL), or wireless technologies such as infrared, radio, and microwave, then the coaxial cable, fiber optic cable, twisted pair, DSL, or wireless technologies such as infrared, radio, and microwave are included in the definition of medium. Disk and disc, as used herein, include CD, laser disc, optical disc, digital versatile disc (DVD), floppy disk and Blu-ray disc where disks usually reproduce data magnetically, while discs reproduce data optically with lasers. Combinations of the above are also included within the scope of computer-readable media.

The previous description of the disclosure is provided to enable a person skilled in the art to make or use the disclosure. Various modifications to the disclosure will be readily apparent to those skilled in the art, and the generic principles defined herein may be applied to other variations without departing from the scope of the disclosure. Thus, the disclosure is not to be limited to the examples and designs described herein but is to be accorded the broadest scope consistent with the principles and novel techniques disclosed herein.

What is claimed is:

1. A method for wireless communication at a user equipment (UE), comprising:
    receiving system information comprising radio access network (RAN) rules, wherein the RAN rules comprise at least one measurement threshold for selecting the cellular RAT or a wireless local area network (WLAN) RAT based on the measurements, wherein the at least one measurement threshold is included in an offload configuration information element (IE) transmitted via a cellular radio access technology (RAT) over a licensed frequency spectrum band to the cellular RAT over an unlicensed frequency spectrum band or to the WLAN RAT;
    determining that both the cellular RAT and the WLAN RAT are available over an unlicensed radio frequency spectrum band, wherein the determining is based at least in part on receiving the system information;
    obtaining measurements for at least the cellular RAT or the WLAN RAT;
    selecting, by the UE, one of the cellular RAT or the WLAN RAT for a class of traffic, wherein the selected RAT is selected based at least in part on the measurements and a comparison of the measurements to the at least one measurement threshold; and
    serving the class of traffic based at least in part on the selected RAT.

2. The method of claim 1, wherein the selected RAT comprises the cellular RAT.

3. The method of claim 1, further comprising:
    saving at least one of identifiers of network access devices that configure the UE to communicate over the unlicensed radio frequency spectrum band based at least in part on the cellular RAT, or physical cell identities associated with the network access devices that configure the UE to communicate over the unlicensed radio frequency spectrum band based at least in part on the cellular RAT; and identifying a network access device within range of the UE;

wherein determining that the cellular RAT is available over the unlicensed radio frequency spectrum band further comprises determining that an identifier of the network access device or a PCI associated with the network access device is saved.

4. The method of claim 1, further comprising:
receiving, from a network access device, a measurement configuration for a predetermined radio frequency spectrum band;
wherein the determination that the cellular RAT is available over the unlicensed radio frequency spectrum band is based at least in part on receiving the measurement configuration for the predetermined radio frequency spectrum band from the network access device.

5. The method of claim 4, wherein the predetermined radio frequency spectrum band comprises a 5 GHz radio frequency spectrum band.

6. The method of claim 4, wherein the predetermined radio frequency spectrum band comprises the unlicensed radio frequency spectrum band.

7. The method of claim 1, wherein determining that the cellular RAT is available over the unlicensed radio frequency spectrum band further comprises receiving, in a broadcast control channel (BCCH), an indication that a network access device supports a use of the cellular RAT over the unlicensed radio frequency spectrum band.

8. The method of claim 1, further comprising:
receiving, from a network access device, an indication of at least one carrier frequency of at least one usable carrier of the cellular RAT over the unlicensed radio frequency spectrum band;
wherein the measurements on the cellular RAT are obtained for the at least one usable carrier.

9. The method of claim 1, wherein obtaining the measurements comprises:
determining at least one of: a reference signal received power (RSRP), a reference signal received quality (RSRQ), or a combination thereof.

10. The method of claim 1, further comprising:
selecting a WLAN channel in the unlicensed radio frequency spectrum band, wherein the WLAN channel is selected for operating a WLAN service, and the WLAN channel is selected based at least in part on a bandwidth used for the cellular RAT over the unlicensed radio frequency spectrum band.

11. The method of claim 1, further comprising:
receiving an access network discovery and selection function (ANDSF) management object comprising ANDSF rules, wherein the ANDSF rules comprise at least one threshold for selecting the cellular RAT or the WLAN RAT based on the measurements;
wherein the selection of the cellular RAT or the WLAN RAT is based at least in part on a comparison of the measurements to the at least one measurement threshold.

12. The method of claim 1, wherein the class of traffic comprises a gateway connection associated with an access point name (APN), and serving the class of traffic comprises at least one of:
initiating the gateway connection, offloading the gateway connection, or performing a handover of the gateway connection.

13. The method of claim 1, further comprising:
determining that the WLAN RAT is associated with a WLAN having a lower priority than a cellular network associated with the cellular RAT; and
selecting the cellular RAT over the WLAN RAT based at least in part on the determined availability of the cellular RAT and the determined lower priority of the WLAN.

14. The method of claim 13, further comprising:
receiving, from a network access device, an indication that the WLAN is associated with the lower priority than the cellular network.

15. The method of claim 13, wherein the WLAN has the lower priority than the cellular network for the class of traffic.

16. An apparatus for wireless communication at a user equipment (UE), comprising:
a processor;
memory in electronic communication with the processor; and
instructions stored in the memory, the instructions being executable by the processor to:
receive system information comprising radio access network (RAN) rules, wherein the RAN rules comprise at least one measurement threshold for selecting the cellular RAT or a wireless local area network (WLAN) RAT based on the measurements, wherein the at least one measurement threshold is included in an offload configuration information element (IE) transmitted via a cellular radio access technology (RAT) over a licensed frequency spectrum band to the cellular RAT over an unlicensed frequency spectrum band or to the WLAN RAT;
determine that both the cellular RAT and the WLAN RAT are available over an unlicensed radio frequency spectrum band, wherein the determining is based at least in part on receiving the system information;
obtain measurements for at least the cellular RAT or the WLAN RAT;
select, by the UE, one of the cellular RAT or the WLAN RAT for a class of traffic, wherein the selected RAT is selected based at least in part on the measurements and a comparison of the measurements to the at least one threshold; and
serve the class of traffic based at least in part on the selected RAT.

17. The apparatus of claim 16, wherein the instructions are executable by the processor to:
save at least one of identifiers of network access devices that configure the UE to communicate over the unlicensed radio frequency spectrum band based at least in part on the cellular RAT, or physical cell identities associated with the network access devices that configure the UE to communicate over the unlicensed radio frequency spectrum band based at least in part on the cellular RAT; and
identify a network access device within range of the UE;
wherein determining that the cellular RAT is available over the unlicensed radio frequency spectrum band comprises determining that an identifier of the network access device or a PCI associated with the network access device is saved.

18. The apparatus of claim 16, wherein the instructions are executable by the processor to:

receive from a network access device, a measurement configuration for a predetermined radio frequency spectrum band;

wherein the determination that the cellular RAT is available over the unlicensed radio frequency spectrum band is further based at least in part on receiving the measurement configuration for the predetermined radio frequency spectrum band from the network access device.

\* \* \* \* \*